US010911306B2

(12) United States Patent
Shibata

(10) Patent No.: US 10,911,306 B2
(45) Date of Patent: Feb. 2, 2021

(54) INFORMATION PROCESSING APPARATUS, CONTROL METHOD, AND STORAGE MEDIUM STORING PROGRAM

(71) Applicant: CANON KABUSHIKI KAISHA, Tokyo (JP)

(72) Inventor: Daisuke Shibata, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 16/183,962

(22) Filed: Nov. 8, 2018

(65) Prior Publication Data

US 2019/0075026 A1    Mar. 7, 2019

Related U.S. Application Data

(63) Continuation of application No. 14/698,271, filed on Apr. 28, 2015, now Pat. No. 10,153,945.

(30) Foreign Application Priority Data

May 9, 2014 (JP) ................................. 2014-098053

(51) Int. Cl.
*G06F 11/00* (2006.01)
*H04L 12/24* (2006.01)
(Continued)

(52) U.S. Cl.
CPC ...... *H04L 41/0853* (2013.01); *G06F 11/1402* (2013.01); *H04L 41/0873* (2013.01);
(Continued)

(58) Field of Classification Search
CPC ............. H04L 41/0853; H04L 41/0873; H04L 67/1095; H04L 41/0813; H04L 41/0856; G06F 11/1402; G06F 2201/805
(Continued)

(56) References Cited

U.S. PATENT DOCUMENTS 7,085,900 B2    8/2006  Inagaki et al.
8,589,495 B1 *  11/2013 Beckert ................... G06F 9/542
                                                       709/204
(Continued)

FOREIGN PATENT DOCUMENTS

JP          08-324071 A     12/1996

*Primary Examiner* — Yair Leibovich
(74) *Attorney, Agent, or Firm* — Venable LLP

(57) ABSTRACT

A communication system includes a server that stores setting information notified from a communication apparatus. The communication apparatus is operable in a first mode and a second mode and includes a reception device to receive an instruction, and a controller to, in accordance with a changing instruction regarding a predetermined function received via the reception device when the first mode is set, notify the server of setting information based on the changing instruction and, in accordance with the changing instruction when the second mode is set, not notify the server of the setting information based on the changing instruction. When a switching instruction for switching from the first mode to the second mode is received, the communication apparatus notifies the server of the setting information which corresponds to the changing instruction received before the switching instruction was received and which has not been notified to the server.

18 Claims, 19 Drawing Sheets

(51) Int. Cl.
 *H04L 29/08* (2006.01)
 *G06F 11/14* (2006.01)
(52) U.S. Cl.
 CPC .... *H04L 67/1095* (2013.01); *G06F 2201/805* (2013.01); *H04L 41/0813* (2013.01); *H04L 41/0856* (2013.01)
(58) Field of Classification Search
 USPC .......................................................... 714/18
 See application file for complete search history.

(56) References Cited

U.S. PATENT DOCUMENTS

| | | |
|---|---|---|
| 2004/0003007 A1 | 1/2004 | Prall et al. |
| 2007/0014314 A1 | 1/2007 | O'Neil |
| 2008/0016207 A1 | 1/2008 | Cheng |
| 2009/0044216 A1 | 2/2009 | McNicoll |
| 2010/0100590 A1 | 4/2010 | Palay et al. |
| 2011/0131321 A1 | 6/2011 | Black |
| 2013/0166580 A1* | 6/2013 | Maharajh ............... H04W 4/18 707/758 |
| 2018/0316381 A1* | 11/2018 | Sharma ................. H04B 1/401 |

\* cited by examiner

F I G. 5A

| KEY IDENTIFIER | UI DISPLAY PHRASE | INITIAL VALUE | RANGE | COMPATIBLE MODEL/ FIRMWARE VERSION | DISPLAY CONDITION |
|---|---|---|---|---|---|
| settings.pattern | COPY-FORGERY-INHIBITED PATTERN PRINTING | 0 | 0-1 | MODEL A/ALL<br>MODEL B/ALL<br>MODEL C/V3.01 OR LATER | COPY-FORGERY-INHIBITED PATTERN LICENSE |
| settings.density | PRINTING DENSITY | 5 | 0-10 | MODEL A/ALL<br>MODEL B/2.01 OR LATER | - |
| settings.density | PRINTING DENSITY | 3 | 0-6 | MODEL B/1.99 OR EARLIER<br>MODEL C/ALL | - |
| ⋮ | | | | | |

F I G. 5B

| KEY IDENTIFIER | VALUE | FINAL UPDATE DATE & TIME |
|---|---|---|
| settings.pattern | 0 | 2013/9/9/12:01 |
| settings.density | 6 | 2013/9/8/17:35 |
| ⋮ | | |

F I G. 5C

| KEY IDENTIFIER | VALUE | FINAL UPDATE DATE & TIME |
|---|---|---|
| settings.pattern | 1 | 2013/5/9/18:42 |
| settings.density | 4 | 2013/6/18/17:12 |
| ⋮ | | |

F I G. 6A

| DEVICE ID | INDIVIDUAL IDENTIFIER |
|---|---|
| 501 | INDIVIDUAL 1 |
| 502 | INDIVIDUAL 2 |
| ... | |

F I G. 6B

| ATTRIBUTE | VALUE |
|---|---|
| INDIVIDUAL IDENTIFIER | INDIVIDUAL 1 |
| MODEL NAME | MODEL A |
| FIRMWARE VERSION | 0.01 |
| INSTALLED LICENSE | COPY-FORGERY-INHIBITED PATTERN LICENSE |
| ACCESSORY | Finisher-X |
| OPERATING STATE | DURING SYNCHRONIZATION |

F I G. 7A

| USER ID | USER NAME | First name | Last name |
|---|---|---|---|
| 501 | sato | TAKASHI | SATO |
| 502 | ii | RYOKO | ii |
| ... | | | |

F I G. 7B

| USER ID | KEY IDENTIFIER | VALUE | FINAL UPDATE DATE & TIME |
|---|---|---|---|
| 511 | preference.print_setting1 | {colormode: "BW", copies : "3"} | 2013/2/4/2:01 |
| 511 | preference.print_setting2 | {colormode: "CL,quality" : "low"} | 2013/2/3/7:35 |
| 511 | preference.address1 | {destination: "sato@oanon.com"} | 2013/8/30/3:01 |
| 511 | preference.address2 | {destination: "user1@oanon.com"} | 2013/1/13/2:16 |
| ... | | | |

FIG. 8

| KEY IDENTIFIER | VALUE | UI DISPLAY PHRASE | INITIAL VALUE | RANGE | DISPLAY CONDITION |
|---|---|---|---|---|---|
| settings.pattern | 1 | COPY-FORGERY-INHIBITED PATTERN PRINTING | 0 | 0-1 | COPY-FORGERY-INHIBITED PATTERN LICENSE |
| settings.density | 4 | PRINTING DENSITY | 5 | 0-10 | - |
| ⋮ | | | | | |

801

INFORMATION PROCESSING APPARATUS, CONTROL METHOD, AND STORAGE MEDIUM STORING PROGRAM

This application is a continuation of application Ser. No. 14/698,271, filed Apr. 28, 2015.

BACKGROUND OF THE INVENTION

Field of the Invention

The present invention relates to an information processing apparatus that performs data synchronous communication with a server, and a storage medium storing a program.

Description of the Related Art

It is known that master data of values set in an information processing apparatus are saved in a server or the like connected via a network and centralized management of them is performed. In this management, the information processing apparatus and the server communicate with each other to synchronize the settings in the information processing apparatus and the master data in the server. For example, when master data in the server is changed, the information processing apparatus acquires the changed value and changes the value of a setting in the information processing apparatus. When a setting in the information processing apparatus is changed, the information processing apparatus transmits the changed value to the server, and the server reflects the value in master data. With this arrangement, the server can confirm, from master data, the synchronous state and settings of each information processing apparatus to be managed.

When the information processing apparatus changes to the above-mentioned synchronous state, it can perform synchronous communication with the server to synchronize settings in the apparatus with master data in the server. However, when the information processing apparatus is in the synchronous state, for example, if the network is disconnected and the information processing apparatus is moved, or the setting of the network is changed, a mismatch may occur in settings between the information processing apparatus and the server. In such a case, the information processing apparatus is changed to the temporary stop state to temporarily stop the synchronous state with the server. Japanese Patent Laid-Open No. 8-324071 discloses an arrangement in which upon receiving information in a sleep mode in which power supply to each unit of an apparatus is paused, subsequent information reception is controlled.

Even when the information processing apparatus is in the temporary stop state, the user can change settings in the information processing apparatus. However, since the information processing apparatus is in the temporary stop state, synchronization with master data by notifying the server of change contents is not performed. Japanese Patent Laid-Open No. 8-324071 discloses an arrangement in which when an information processing apparatus receives external information during the sleep mode, subsequent information reception is controlled. However, in Japanese Patent Laid-Open No. 8-324071, a synchronous communication request cannot be controlled along with a change of data in the information processing apparatus.

SUMMARY OF THE INVENTION

An aspect of the present invention is to eliminate the above-mentioned problems with the conventional technology. The present invention provides an information processing apparatus that appropriately synchronizes data in the apparatus with data in a server, a control method, and a storage medium storing a program.

The present invention in one aspect provides an information processing apparatus that performs synchronous communication to synchronize data in the apparatus and data in a server, comprising: a mode setting unit configured to set the information processing apparatus in one of a synchronous communication mode in which the synchronous communication is performed, and a stop mode in which the synchronous communication is stopped; an acceptance unit configured to accept a change request for data subjected to the synchronous communication; a change unit configured to change the data subjected to the synchronous communication in accordance with the change request accepted by the acceptance unit; a determination unit configured to, in a case where the change unit changes the data in accordance with the change request while the mode setting unit sets the information processing apparatus in the stop mode, determine whether to synchronize the changed data and the data in the server; and a communication control unit configured to, in a case where the determination unit determines to synchronize the changed data and the data in the server, transmit the changed data to the server by the synchronous communication even if the stop mode is set.

According to the present invention, data in the apparatus can be appropriately synchronized with data in the server.

Further features of the present invention will become apparent from the following description of exemplary embodiments with reference to the attached drawings.

BRIEF DESCRIPTION OF THE DRAWINGS

FIGS. 5A to 5C are tables showing the settings of the master data;

FIGS. 6A and 6B are other tables showing the settings of the master data;

FIGS. 7A and 7B are other tables showing the settings of the master data;

FIG. 8 is a table showing a setting database in the multifunctional peripheral;

DESCRIPTION OF THE EMBODIMENTS

Figure 1:
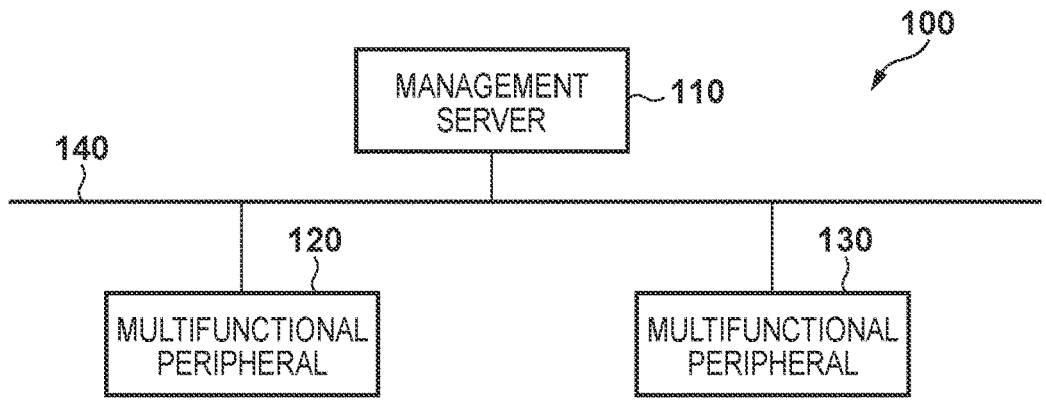
FIG. 1 is a block diagram showing the arrangement of a data synchronization system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

First Embodiment

FIG. 1 is a block diagram showing the arrangement of a data management system according to the first embodiment. A data management system (to be referred to as a system hereinafter) 100 includes a management server 110, and multifunctional peripherals 120 and 130. The respective apparatuses are connected via a network 140 so that they can communicate with each other. The management server 110 monitors the multifunctional peripherals 120 and 130 (to be also generically referred to as devices hereinafter), and monitors the apparatus states, device configurations, and the like of the respective devices. The management server 110 holds master data of settings stored in the multifunctional peripherals 120 and 130, and can synchronize the master data with the contents of the settings in the respective devices by performing synchronous communication. The settings here are, for example, device settings regarding respective modes such as a user mode and a service mode. The settings are also, for example, user settings (user data) such as a custom menu, individual settings, and address book. Further, the settings are settings (device configuration information) such as a device configuration, license information, and a device operating state. Synchronous communication includes communication in which an apparatus transmits a request to a partner apparatus to acquire data held in the partner apparatus, and makes the contents of data held in the apparatus match the acquired data. Also, synchronous communication includes transmission of data in the apparatus to the partner apparatus at the timing when data in the apparatus was changed.

When master data in the management server 110 is changed, the management server 110 notifies the multifunctional peripherals 120 and 130 via the network 140 of the change information. When the management server 110 receives change information of a setting from the multifunctional peripheral 120 or 130, it changes the value of master data in the management server 110. In this manner, settings are synchronized between the management server 110 and the multifunctional peripherals 120 and 130 in the system 100. Since the multifunctional peripherals 120 and 130 have the same arrangement in the system 100, the multifunctional peripheral 120 will be handled as a typical example of the multifunctional peripherals 120 and 130, unless otherwise specified.

The multifunctional peripheral 120 is a so-called MFP capable of executing a plurality of types of functions such as the copy function and FAX function. The multifunctional peripheral 120 stores, in the internal storage area, settings used when executing these functions. When a setting is changed, the multifunctional peripheral 120 notifies the management server 110 via the network 140 of change information. When the multifunctional peripheral 120 receives change information of master data from the management server 110, it changes the value of a setting in the multifunctional peripheral 120. Depending on a setting, synchronization of settings is sometimes performed between the multifunctional peripherals 120 and 130.

When master data in the management server 110 is changed, both the multifunctional peripherals 120 and 130 are notified of change information of the setting. When a setting in either the multifunctional peripheral 120 or 130 is changed, one multifunctional peripheral notifies the management server 110 of change information, and then notifies the other multifunctional peripheral via the management server 110 of the change information.

Figure 2:
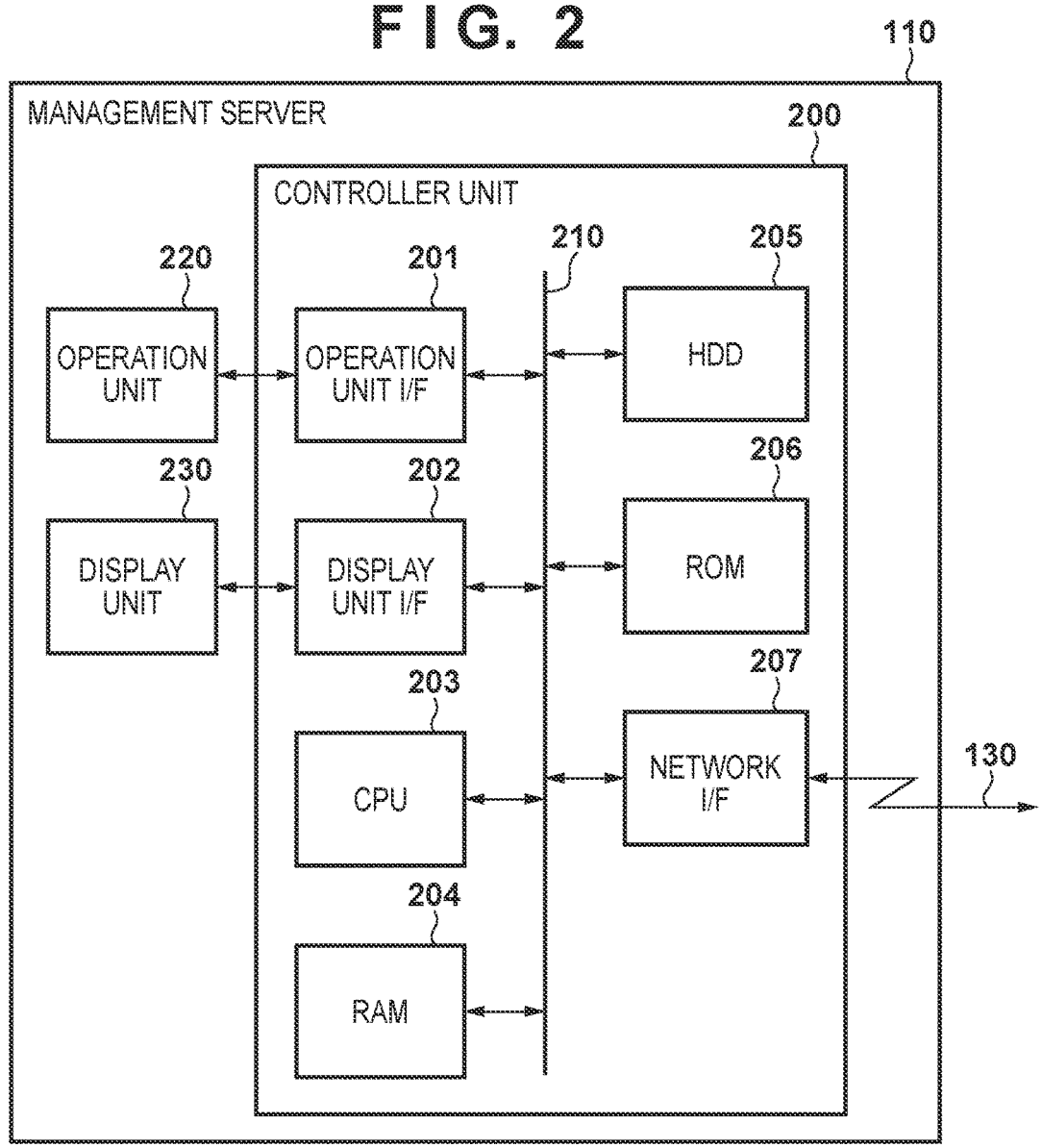
FIG. 2 is a block diagram showing the arrangement of a management server.

FIG. 2 is a block diagram showing the arrangement of the management server 110. The management server 110 includes a controller unit 200, an operation unit 220, and a display unit 230. The controller unit 200 includes a CPU 203. The CPU 203 activates an OS according to a boot program stored in a ROM 206. On the OS, the CPU 203 executes an application program (to be referred to as an application hereinafter) stored in a hard disk drive (HDD) 205, thereby executing various processes. A RAM 204 is used as the working memory of the CPU 203.

The HDD 205 stores applications, master data, and the like. A master data management method will be described later. An operation unit I/F 201, a display unit I/F 202, and a network I/F 207 are connected to a system bus 210, in addition to the ROM 206 and the RAM 204. The operation unit I/F 201 is an interface with the operation unit 220 including a pointing device and a keyboard. The operation unit I/F 201 transmits, to the CPU 203, information input from a user via the operation unit 220. The display unit I/F 202 outputs, to the display unit 230, screen data to be displayed on the display unit 230 including a display. The network I/F 207 transmits/receives data to/from each apparatus on the network 140.

Figure 3:
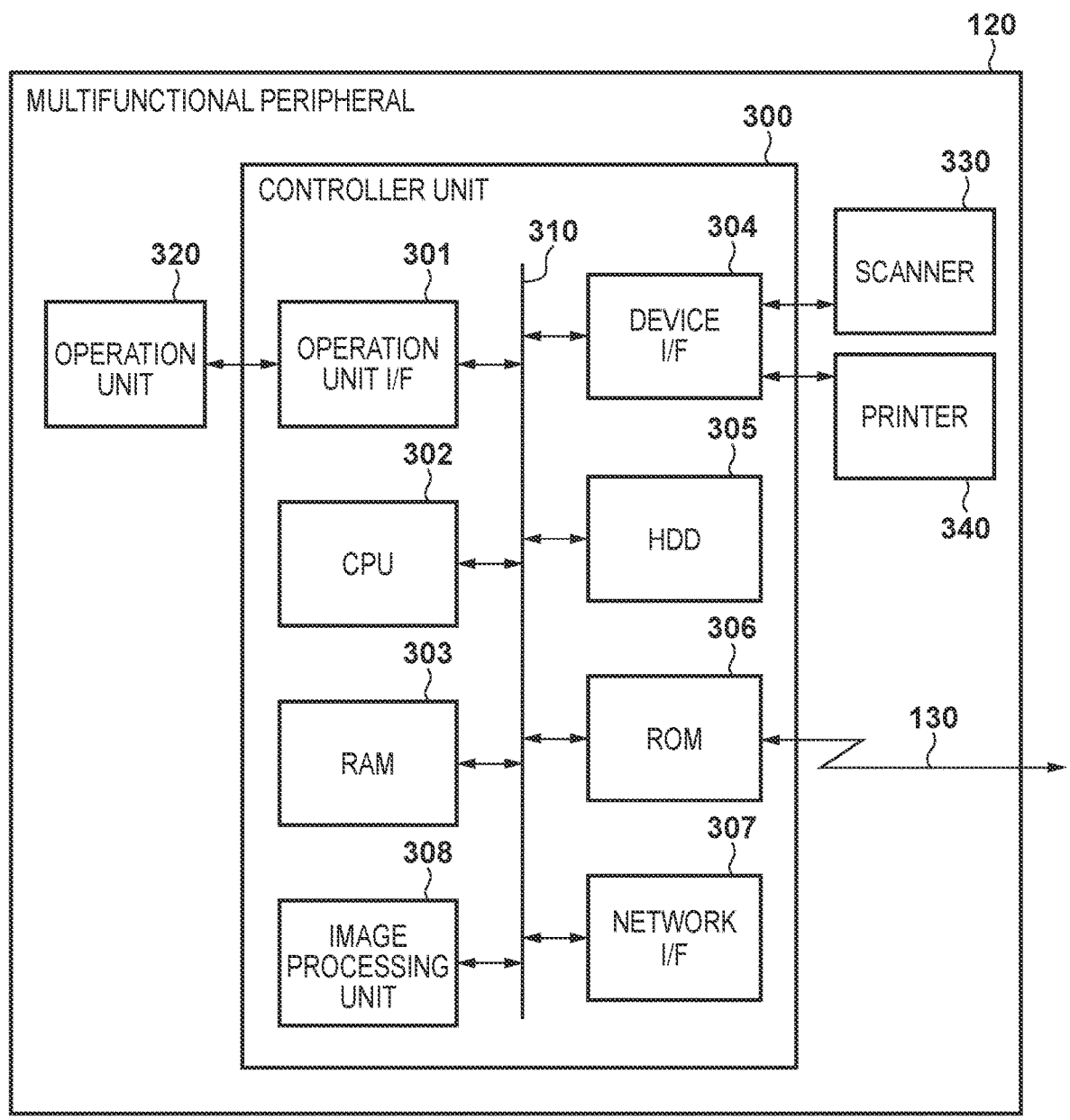
FIG. 3 is a block diagram showing the arrangement of a multifunctional peripheral.

FIG. 3 is a block diagram showing the arrangement of the multifunctional peripheral 120. The multifunctional peripheral 120 includes a controller unit 300, an operation unit 320, a scanner 330, and a printer 340. The controller unit 300 is connected to the operation unit 320, and also connected to the scanner 330 serving as an image input device and the printer 340 serving as an image output device.

The controller unit 300 includes a CPU 302. The CPU 302 activates an OS according to a boot program stored in a ROM 306. On the OS, the CPU 302 executes an application program (to be referred to as an application hereinafter) stored in a hard disk drive (HDD) 305, thereby executing various processes. A RAM 303 is used as the working memory of the CPU 302, and an image memory area for temporarily storing image data. The HDD 305 stores applications, image data, and settings. A setting management method in the multifunctional peripheral 120 will be described later.

An operation unit I/F 301, a device I/F 304, a network I/F 307, and an image processing unit 308 are connected to a system bus 310, in addition to the ROM 306 and the RAM 303. The operation unit I/F 301 is an interface with the operation unit 320 including a touch panel. The operation unit I/F 301 transmits, to the operation unit 320, screen data to be displayed on the operation unit 320. The operation unit I/F 301 transmits, to the CPU 302, information input from a user via the operation unit 320. The device I/F 304 is connected to the scanner 330 and the printer 340, and performs synchronous/asynchronous conversion of image data. The network I/F 307 transmits/receives data to/from each apparatus on the network 140. The image processing unit 308 performs processing such as input processing of image data read by the scanner 330, output processing of image data to the printer, rotation/compression of an image, resolution conversion, color space conversion, and tone conversion.

Figure 4:
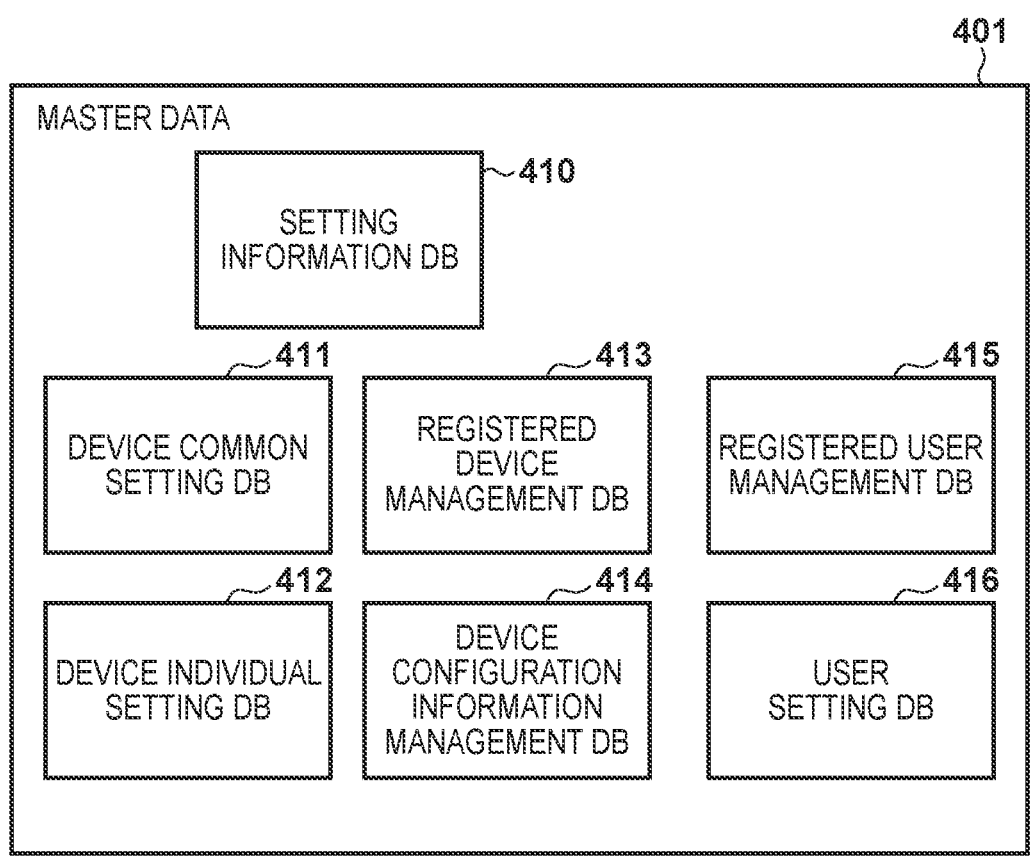
FIG. 4 is a block diagram showing the configuration of master data.

FIG. 4 is a block diagram showing the configuration of master data held and managed in the management server 110. Master data 401 includes settings regarding a device and settings regarding a user. The settings regarding the device include a setting information database (DB) 410, a device common setting DB 411, a registered device management DB 413, a device individual setting DB 412, and a device configuration information management DB 414. The settings regarding the user include a registered user management DB 415 and a user setting DB 416.

FIG. 5A is a table showing an example of data stored in the setting information DB 410. The setting information DB 410 is a database that stores metadata regarding each setting managed in the management server 110. The setting information DB 410 includes a phrase to be presented to a user, a key identifier for identifying a setting when communicating with a device, an initial value, a range, a compatible model/firmware version, and a setting display condition (for example, necessary license name). As for each setting managed in the setting information DB 410, whether it depends on the device model or the firmware version, or the range or initial value of the setting may be different. For example, in FIG. 5A, a setting identified by a key identifier "settings.pattern" exists for all individuals of model A and model B, but exists for only individuals of firmware version 3.01 or later for model C. As for a setting identified by a key identifier "settings.density", the range and initial value of the setting are different depending on the version of installed firmware for model B.

FIG. 5B is a table showing an example of data stored in the device common setting DB 411. The device common setting DB 411 is a database for managing a setting shared between all devices to be managed by the management server 110. The device common setting DB 411 stores a key identifier, a value corresponding to the identifier, and the final update date & time of a setting. The key identifier is an identifier of the same system as that of the key identifier in the setting information DB 410.

FIG. 5C is a table showing an example of data stored in the device individual setting DB 412. The device individual setting DB 412 is a database for managing a setting whose value differs between a plurality of devices to be managed by the management server 110. A plurality of device individual setting DBs 412 exist in correspondence with respective multifunctional peripherals. The device individual setting DB 412 stores a key identifier, a value corresponding to the identifier, and the final update date & time of a setting. The key identifier is an identifier of the same system as that of the key identifier in the setting information DB 410.

FIG. 6A is a table showing an example of data stored in the registered device management DB 413. The registered device management DB 413 is a database for managing information of a device to be managed by the management server 110. The registered device management DB 413 stores a device ID for uniquely identifying a device to be managed, an individual identifier for identifying a device individual, and the like. For example, identification information that can be uniquely discriminated in the system 100 may be used as the device ID. For example, a MAC address may be used as the individual identifier.

FIG. 6B is a table showing an example of data stored in the device configuration information management DB 414. The device configuration information management DB 414 represents the contents of device configuration information for each device individual. A plurality of device configuration information management DBs 414 exist in correspondence with respective devices. The device configuration information includes an individual identifier for identifying a device individual, a model name, a firmware version, installed license information representing an available function, an accessory, and the operating state of the individual. The model name, firmware version, and license in FIG. 6B are pieces of information of the same system as that of pieces of information stored in the setting information DB 410. The operating state is, for example, whether the individual is in the synchronous communication mode or the temporary stop mode.

The synchronous communication mode is a mode in which databases as shown in FIG. 4 exist in the management server 110, and a device performs synchronous communication with the management server 110 at a predetermined time interval to synchronize data in the management server 110 and data in the device by synchronous communication. The temporary stop mode is a mode in which synchronous communication with the management server 110 is temporarily stopped. For example, when disconnecting the multifunctional peripheral 120 from the network 140 and moving the multifunctional peripheral 120, the multifunctional peripheral 120 is set in the temporary stop mode. The CPU 302 sets the synchronous communication mode or the temporary stop mode.

FIG. 7A is a table showing an example of data stored in the registered user management DB 415. The registered user management DB 415 is a database for managing information about a user who uses a device. The registered user management DB 415 stores a user ID for uniquely identifying a user, a user name that is input by a user at the time of login, and the like.

FIG. 7B is a table showing an example of data stored in the user setting DB 416. The user setting DB 416 is a database for managing settings for each user that are usable by each user of a device. The user setting DB 416 stores a user ID for uniquely identifying a user, a key identifier for uniquely identifying a setting, the contents of the setting, and the final update date & time of the setting. For example, "color mode, BW, copies: 3" are set in print setting 1 of a user identified by a user ID "511". The user ID is a user ID of the same system as that of the user ID in the registered user management DB 415.

By using the respective databases of the master data 401, the management server 110 can perform centralized management of settings that are different between devices to be managed, settings common to all devices to be managed, metadata of each setting, and user data.

FIG. 8 is a table showing an example of a setting DB 801 stored in the HDD 305 of the device. The setting DB 801 is a database that stores settings used in a device. The settings stored in the setting DB 801 include a key identifier for identifying a setting, the value of the setting, a UI display phrase, an initial value, a range, a display condition, and the like. These elements are pieces of information of the same system as that of pieces of information in FIG. 5A that are managed by the master data 401. When a setting is changed in the management server 110 or the device, synchronous communication of the setting with a communication destination apparatus is performed using the key identifier and value shown in FIG. 8. Synchronous communication of each setting is performed between the network I/F 207 of the management server 110 and the network I/F 307 of the device via the network 140.

In addition to the setting DB 801 shown in FIG. 8, the HDD 305 of the device stores even data of the same system as that of data shown in FIGS. 7A and 7B. When a setting is changed in the management server 110 or the device, synchronous communication of the setting with a communication destination apparatus is performed using a user ID.

Figure 9:
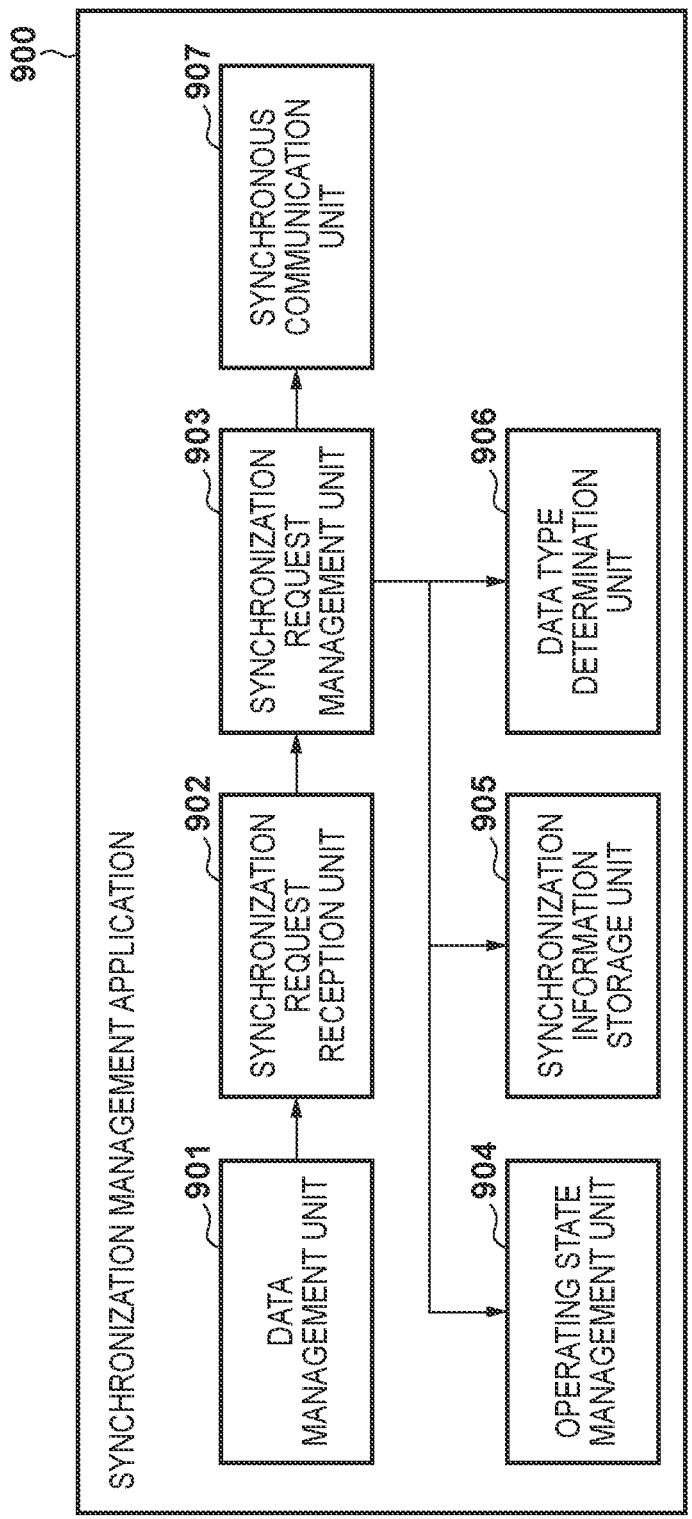
FIG. 9 is a block diagram showing the synchronization management application of the multifunctional peripheral.

FIG. 9 is a block diagram showing a synchronization management application 900 that operates in the multifunctional peripheral 120. Respective blocks constituting the synchronization management application 900 will be explained below. The synchronization management application 900 is stored in one of the RAM 303, the HDD 305, and the ROM 306, and is read out and executed by the CPU 302, implementing synchronous communication control according to each embodiment.

A data management unit 901 manages access such as that for writing/reading to the setting DB 801 shown in FIG. 8. Also, when a data change request to the setting DB 801 or a user setting is generated, the data management unit 901 outputs a change content synchronization request to a synchronization request reception unit 902. The data change request is, for example, a data editing request from a user, and is accepted via a user interface screen or the like. The synchronization request includes a data type, a key identifier for identifying a setting, the value of the setting, request acceptance time, and when the setting is a user setting, a user ID and user name. The synchronization request reception unit 902 receives synchronization requests from the data management unit 901, and notifies a synchronization request management unit 903 of the synchronization requests in the reception order.

By using the notified synchronization requests, an operating state management unit 904, and a data type determination unit 906, the synchronization request management unit 903 determines whether to perform synchronous communication with the management server 110. When the synchronization request management unit 903 determines to perform synchronous communication, it causes a synchronization information storage unit 905 to store the notified synchronization requests in a storage area. When performing synchronous communication with the management server 110, the synchronization request management unit 903 outputs the notified synchronization requests to a synchronous communication unit 907. The operating state management unit 904 determines one of the synchronous communication mode, asynchronous communication mode, and temporary stop mode that is taken by the multifunctional peripheral 120. The operating state management unit 904 then notifies the synchronization information storage unit 905 of the determination result. The asynchronous communication mode is a state in which the multifunctional peripheral 120 does not perform synchronous communication of a setting with the management server 110.

The synchronization information storage unit 905 stores information of an accepted synchronization request in the storage area. The synchronization information storage unit 905 stores, for example, information of the accepted synchronization request in the file format in a storage area such as the HDD 305. The data type determination unit 906 determines which of a device setting, a user setting, and device configuration information is included as the type of data in the accepted synchronization request. The synchronous communication unit 907 performs synchronous communication with the management server 110 via the network I/F 207 by using the synchronization request output from the synchronization request management unit 903.

Figure 10:
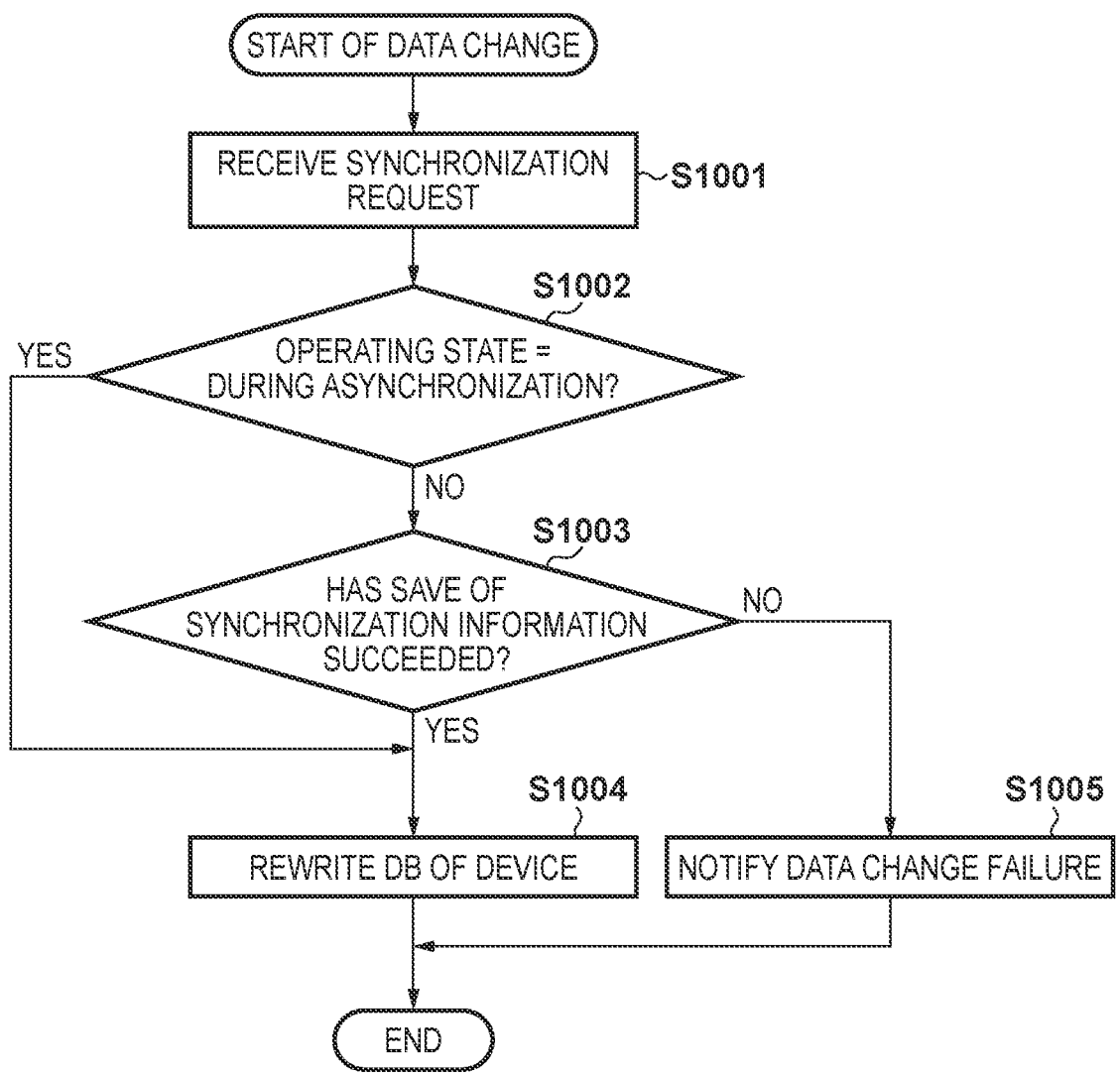
FIG. 10 is a flowchart showing processing when a synchronization request is accepted.
Figure 11:
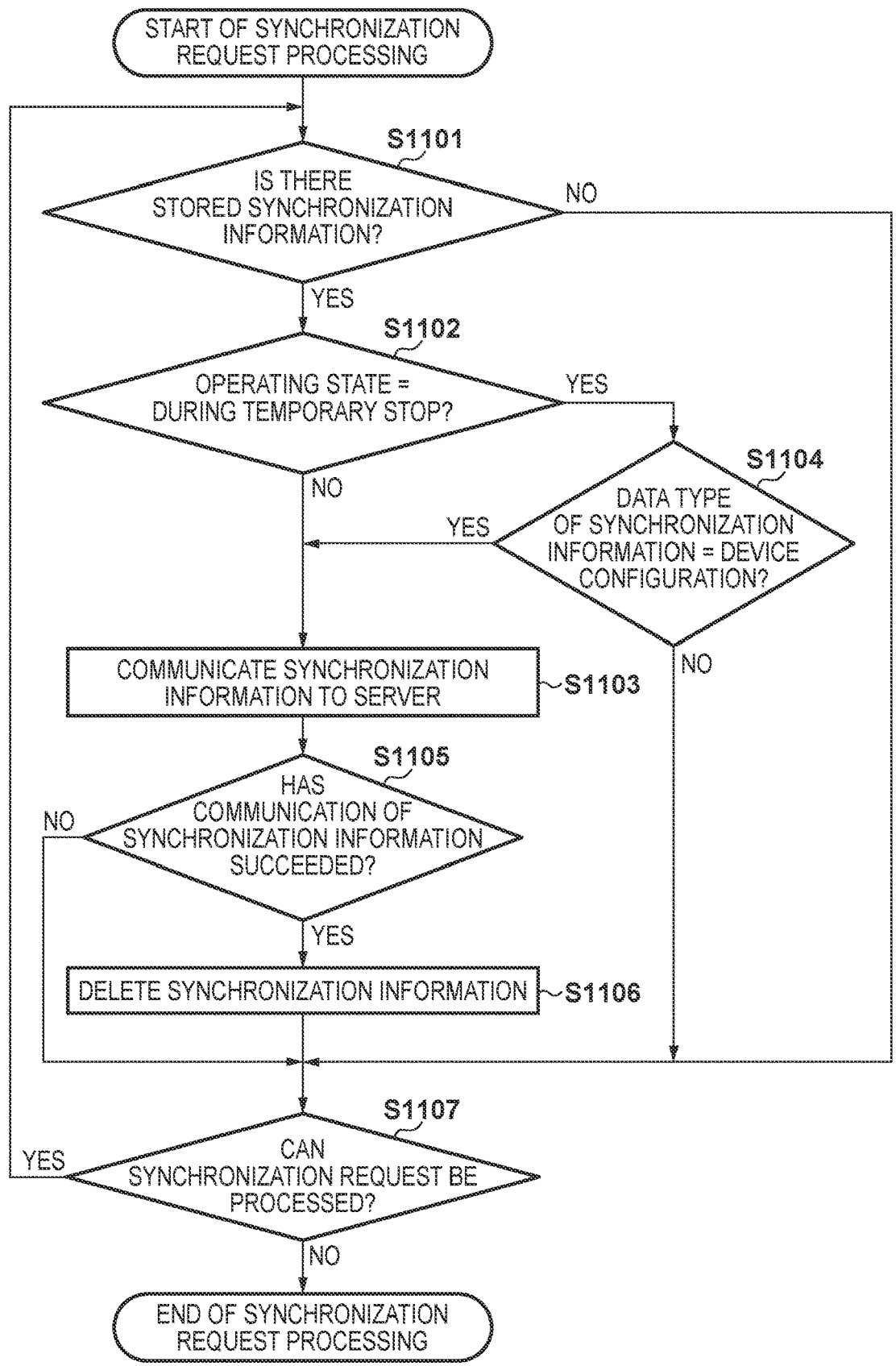
FIG. 11 is a flowchart showing processing of a synchronization request.

FIGS. 10 and 11 are flowcharts showing the procedures of processing to be executed by the synchronization management application 900 when the device synchronizes a setting with a corresponding one in the management server 110. The multifunctional peripheral 120 will be explained as an example of the device. The flowchart of FIG. 10 shows procedures from acceptance of a setting change instruction from a user by the data management unit 901 up to processing of it as a synchronization request to the management server 110. First, when the data management unit 901 accepts a setting change request on a user interface screen displayed on the operation unit 320, it transmits a setting synchronization request to the synchronization request reception unit 902.

In step S1001, the synchronization request reception unit 902 receives the synchronization request from the data management unit 901. The synchronization request reception unit 902 notifies the synchronization request management unit 903 of the received synchronization request. In step S1002, the synchronization request management unit 903 inquires an operating state of the operating state management unit 904 and acquires it, in order to determine whether to synchronize the notified synchronization request with the management server 110. If the acquired operating state is the asynchronous communication mode (during asynchronization), the process advances to step S1004. If the acquired operating state is the synchronous communication mode or the temporary stop mode, the process advances to step S1003.

In step S1003, the synchronization request management unit 903 causes the synchronization information storage unit 905 to perform save processing, in the HDD 305, of information included in the synchronization request received in step S1001. If the save by the synchronization information storage unit 905 succeeds, the process advances to step S1004. If the save fails, the process advances to step S1005.

In step S1004, the synchronization request management unit 903 notifies the data management unit 901 via the synchronization request reception unit 902 that the acceptance of the synchronization request has been completed. Upon receiving the synchronization request acceptance completion notification, the data management unit 901 performs change processing of the target data in the setting DB 801 of FIG. 8 in the device in accordance with the contents of the data change request. After the processing in step S1004, the processing in FIG. 10 ends. In step S1005, the synchronization request management unit 903 notifies the data management unit 901 via the synchronization request reception unit 902 that the acceptance of the synchronization request has failed. Upon receiving the synchronization request failure notification, the data management unit 901 discards the accepted data change request, and the processing in FIG. 10 ends.

The flowchart of FIG. 11 shows the procedures of processing of a synchronization request accepted by the synchronization request management unit 903. The processing shown in FIG. 11 is executed when data change processing of the setting DB 801 is performed by the processing of FIG. 10 and the synchronization request management unit 903 becomes able to process a synchronization request.

In step S1101, the synchronization request management unit 903 determines whether there is information (to be referred to as synchronization information hereinafter) included in a synchronization request stored by the synchronization information storage unit 905. If the synchronization request management unit 903 determines that there is synchronization information, the process advances to step S1102. If the synchronization request management unit 903 determines that there is no synchronization information, the process advances to step S1107. When there are pieces of synchronization information at the time of the processing in step S1101, they are processed in ascending order of the synchronization information request time.

In step S1102, the synchronization request management unit 903 inquires the operating state of the multifunctional peripheral 120, of the operating state management unit 904 and acquires it. Then, the synchronization request management unit 903 determines, as a result of the inquiry, whether the operating state is the temporary stop mode (during temporary stop). If the synchronization request management unit 903 determines that the operating state is the temporary stop mode, the process advances to step S1104. If the synchronization request management unit 903 determines that the operating state is not the temporary stop mode, the process advances to step S1103.

In step S1103, the synchronization request management unit 903 requests synchronous communication using synchronization information of the synchronous communication unit 907. The synchronous communication unit 907 transmits the accepted synchronization information to the management server 110 by synchronous communication. In step S1104, the synchronization request management unit 903 causes the data type determination unit 906 to determine whether the data type of the synchronization information is device configuration information. If the data type determination unit 906 determines that the data type is device configuration information, the process advances to step S1103. If the data type determination unit 906 determines that the data type is not device configuration information, the process advances to step S1107.

In step S1105, the synchronous communication unit 907 notifies the synchronization request management unit 903 of information representing whether synchronous communication with the management server 110 has succeeded. Based on the notified information, the synchronization request management unit 903 determines whether synchronous communication has succeeded or failed. If the synchronization request management unit 903 determines that synchronous communication has succeeded, the process advances to step S1106. If the synchronization request management unit 903 determines that synchronous communication has failed, the process advances to step S1107.

In step S1106, the synchronization request management unit 903 instructs the synchronization information storage unit 905 to delete the synchronization information for which it is determined that synchronous communication has succeeded. The synchronization information storage unit 905 deleted the target synchronization information from the storage area. In step S1107, the synchronization request management unit 903 determines whether processing of the synchronization request is possible. For example, when the multifunctional peripheral 120 has accepted an end request or the operating state has changed to the asynchronous communication mode, the synchronization request management unit 903 determines that the synchronization request cannot be processed. If the synchronization request management unit 903 determines that the synchronization request can be processed, the processing from step S1101 is repeated. If the synchronization request management unit 903 determines that the synchronization request cannot be processed, the processing in FIG. 11 ends.

As described above, according to the first embodiment, even when the operating state of the multifunctional peripheral 120 is the temporary stop mode, information (for example, device configuration information) of which the management server 110 should be notified can be synchronized with corresponding information in the management server 110. As a result, even when the operating state is the temporary stop mode, the operating state of the information processing apparatus can be confirmed by confirming master data in the management server 110. Although the first embodiment has explained device configuration information of the multifunctional peripheral 120 as information of which the management server 110 should be notified, the information may be not device configuration information but other information unique to or associated with the multifunctional peripheral 120.

Second Embodiment

In the first embodiment, when the data type is device configuration information, as shown in step S1104 of FIG. 11, even if the operating state of the multifunctional peripheral 120 is the temporary stop mode, synchronous communication with the management server 110 is performed for a setting that should be synchronized with a corresponding one in the management server 110. A case will be explained, in which the operating state changes to the temporary stop mode before the end of synchronous communication triggered by a synchronization request accepted when the operating state of a multifunctional peripheral 120 was the synchronous communication mode, that is, before the completion of transmission processing of a changed setting to a management server 110. In this case, the setting changed in the synchronous communication mode may not be synchronized with a corresponding one in the management server 110. The second embodiment will explain a synchronization request processing method when the operating state changes to the temporary stop mode before the end of synchronous communication triggered by a synchronization request accepted when the operating state was the synchronous communication mode. A difference from the first embodiment will be explained below.

Figure 12:
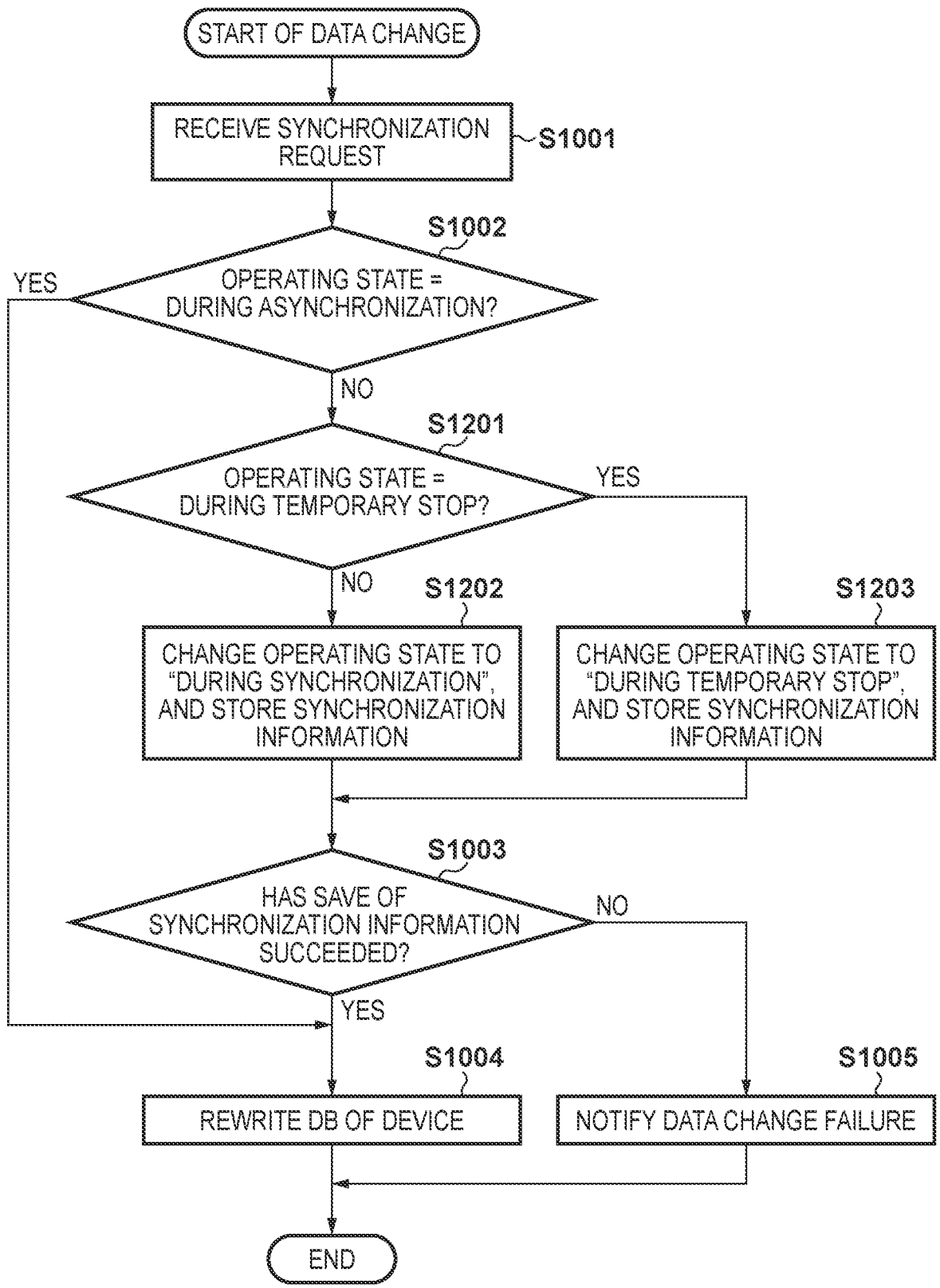
FIG. 12 is another flowchart showing processing when a synchronization request is accepted.
Figure 13:
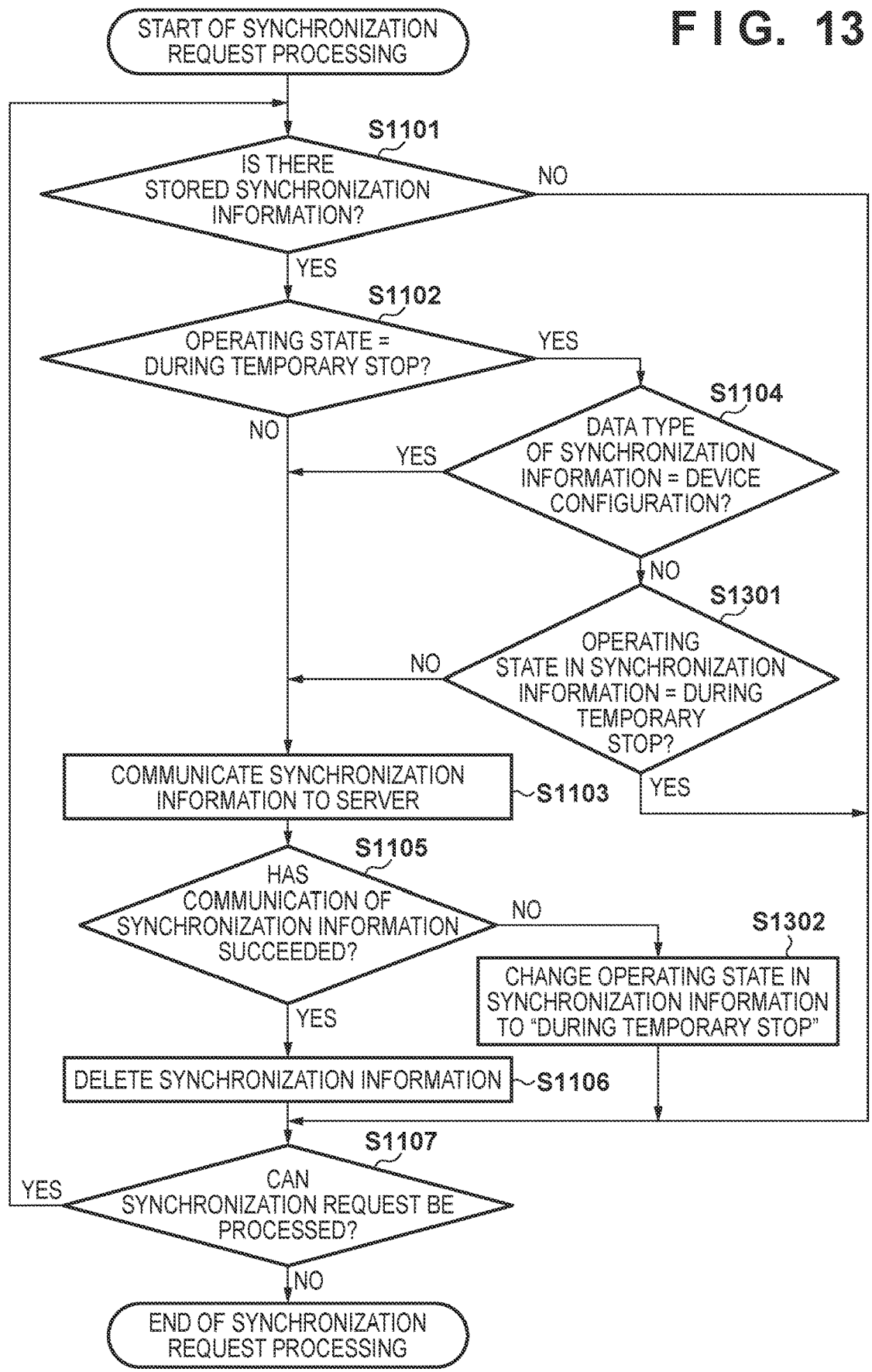
FIG. 13 is another flowchart showing processing of a synchronization request.

FIGS. 12 and 13 are flowcharts showing the procedures of processing to be executed by a synchronization management application 900 when the multifunctional peripheral 120 synchronizes a setting with a corresponding one in the management server 110 according to the second embodiment. As in the first embodiment, the flowchart of FIG. 12 shows procedures from acceptance of a setting change instruction from a user by a data management unit 901 up to processing of it as a synchronization request to the management server 110. First, when the data management unit 901 accepts a setting change request on a user interface screen displayed on an operation unit 320, it transmits a setting synchronization request to a synchronization request reception unit 902.

Steps S1001 and S1002 in FIG. 12 correspond to the explanation in FIG. 10. If it is determined in step S1002 that the multifunctional peripheral 120 is not during asynchronization (that is, is in the synchronous communication mode or the temporary stop mode), the process advances to step S1201. In step S1201, a synchronization request management unit 903 determines whether an operating state acquired from an operating state management unit 904 is the temporary stop mode (during temporary stop). If the synchronization request management unit 903 determines that the operating state is the temporary stop mode, the process advances to step S1203. If the synchronization request management unit 903 determines that the operating state is not the temporary stop mode (that is, is the synchronous communication mode), the process advances to step S1202.

In step S1202, the synchronization request management unit 903 causes a synchronization information storage unit 905 to add information of an operating state set at the time of acceptance, that is, "synchronous communication mode" to the synchronization request notified in step S1001, and perform save processing to an HDD 305. The process then advances to step S1003. In step S1203, the synchronization request management unit 903 causes the synchronization information storage unit 905 to add information of the operating state at the time of acceptance, that is, "temporary stop mode" to the synchronization request notified in step S1001, and perform save processing to the HDD 305. After that, the process advances to step S1003. Steps S1003 to S1005 correspond to the explanation in FIG. 10.

The flowchart of FIG. 13 shows the procedures of processing of a synchronization request accepted by the synchronization request management unit 903 according to the second embodiment. The processing shown in FIG. 13 is executed when data change processing of a setting DB 801 is performed by the processing of FIG. 12 and the synchronization request management unit 903 becomes able to process a synchronization request.

Steps S1101 to S1107 in FIG. 13 correspond to the explanation in FIG. 11. If it is determined in step S1104 of FIG. 13 that the data type of synchronization information is not device configuration information, the process advances to step S1301. In step S1301, the synchronization request management unit 903 refers to an operating state included in the synchronization information during processing, and determines whether this synchronization information is a synchronization request accepted in the temporary stop mode. If the synchronization request management unit 903 determines that the synchronization information is a synchronization request accepted in the temporary stop mode, the process advances to step S1107. If the synchronization request management unit 903 determines that the synchronization information is not a synchronization request accepted in the temporary stop mode, the process advances to step S1103.

In step S1105 of FIG. 13, as described with reference to FIG. 11, a synchronous communication unit 907 notifies the synchronization request management unit 903 of information representing whether synchronous communication with the management server 110 has succeeded. Based on the notified information, the synchronization request management unit 903 determines whether synchronous communication has succeeded or failed. If the synchronization request management unit 903 determines that synchronous communication has succeeded, the process advances to step S1106. If the synchronization request management unit 903 determines that synchronous communication has failed, the process advances to step S1302. In step S1302, the synchronization request management unit 903 changes information of the operating state in the synchronization information to "temporary stop mode", and causes the synchronization information storage unit 905 to save the information in the HDD 305. Then, the process advances to step S1107.

As described above, according to the second embodiment, even when the operating state is the temporary stop state, a synchronization request accepted when the operating state was the synchronous state is processed. Hence, synchronous communication with the management server 110 can be executed even for a setting changed before the operating state changes to the temporary stop state.

In this embodiment, either of the synchronous communication mode or the temporary stop mode in which a synchronization request was accepted is determined by adding, to synchronization information, an operating state set when the synchronization request was accepted. If the synchronization request was accepted in the synchronous communication mode and the operating state has changed to the temporary stop mode before the end of synchronous communication, synchronous communication with the management server 110 is performed for untransmitted data corresponding to the synchronization request.

In this embodiment, the arrangement for determining an operating state when a synchronization request was accepted is not limited to the above-described arrangement in which an operating state is added to synchronization information. This arrangement may be implemented by, for example, changing a file name in accordance with the operating state or changing the save location in accordance with the operating state.

Third Embodiment

Device configuration information or a user setting may be browsed by a management server 110 or used by another device. Thus, when synchronous communication is performed and fails, it needs to be retried until it succeeds. In the third embodiment, when the operating state is the temporary stop mode, the data type of a synchronous communication target is device configuration information or a user setting, and if synchronous communication fails, the synchronous communication is retried until it succeeds. A difference from the first and second embodiments will be explained below.

Figure 14:
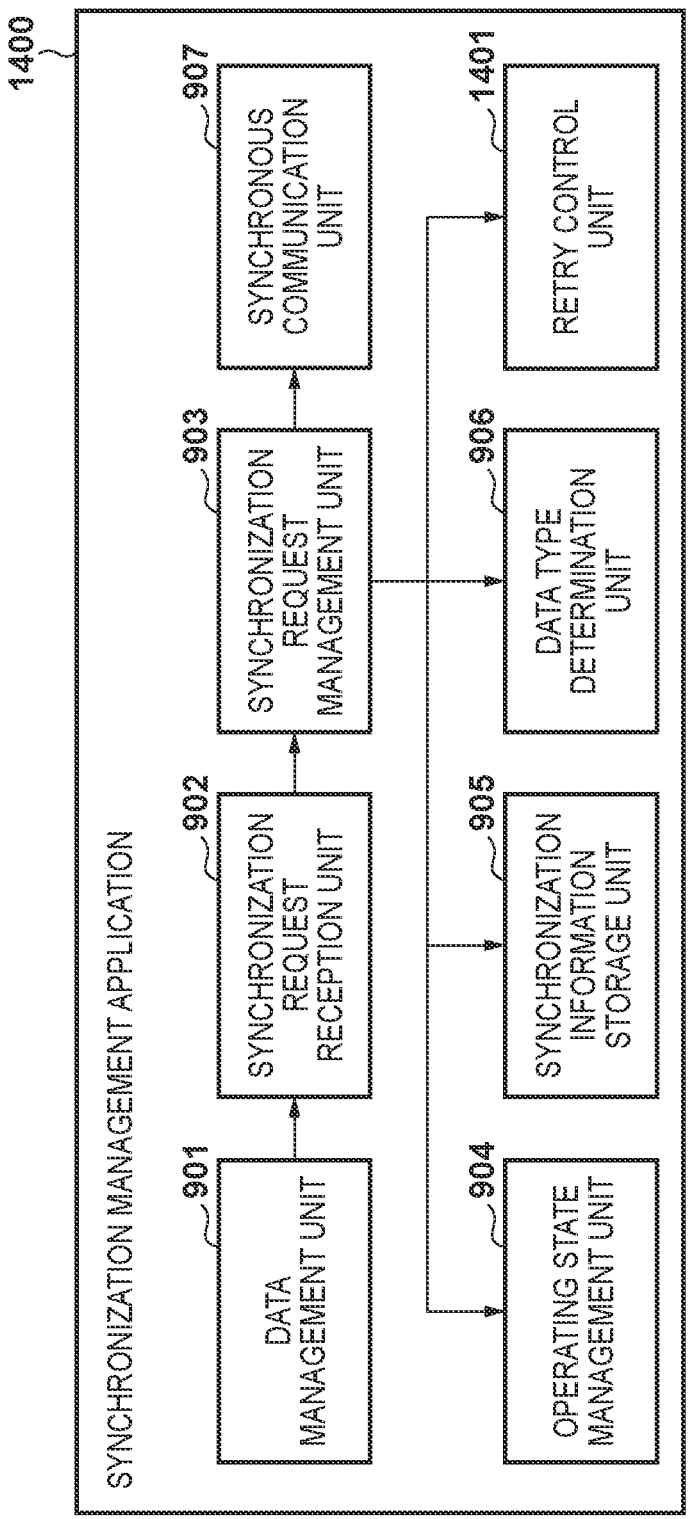
FIG. 14 is another block diagram showing the synchronization management application of the multifunctional peripheral.

FIG. 14 is a block diagram showing a synchronization management application 1400 that operates in a multifunctional peripheral 120 according to the third embodiment. As shown in FIG. 14, a synchronization request management unit 903 is also connected to a retry control unit 1401. The retry control unit 1401 retries synchronous communication corresponding to a synchronization request that is processed by the synchronization request management unit 903. For example, when synchronous communication by a synchronous communication unit 907 fails and synchronization information stored by a synchronization information storage unit 905 is not deleted, it is determined whether to execute again (retry) synchronous communication corresponding to this synchronization request.

Figure 15:
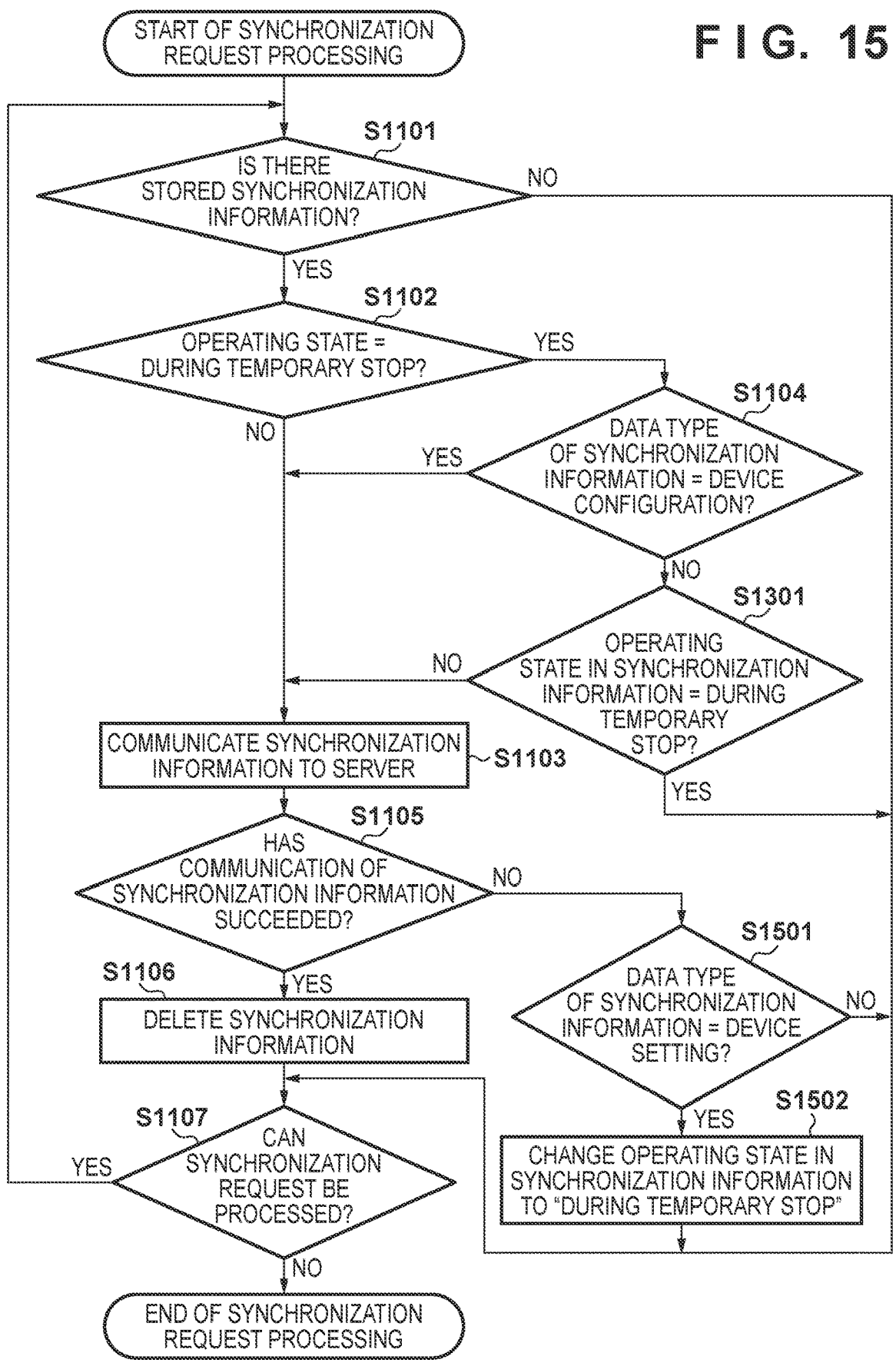
FIG. 15 is another flowchart showing processing of a synchronization request.

The flowchart of FIG. 15 shows the procedures of processing of a synchronization request accepted by the synchronization request management unit 903 according to the third embodiment. The processing shown in FIG. 15 is executed when data change processing of a setting DB 801 is performed by the processing of FIG. 12 and the synchronization request management unit 903 becomes able to process a synchronization request.

Steps S1101 to S1107 and S1301 in FIG. 15 correspond to the explanation of steps S1101 to S1107 and S1301 in FIG. 13.

In step S1105 of FIG. 15, as described with reference to FIG. 11, the synchronous communication unit 907 notifies the synchronization request management unit 903 of information representing whether synchronous communication with the management server 110 has succeeded. Based on the notified information, the synchronization request management unit 903 determines whether synchronous communication has succeeded or failed. If the synchronization request management unit 903 determines that synchronous communication has failed, the process advances to step S1501.

In step S1501, the synchronization request management unit 903 causes a data type determination unit 906 to determine whether the data type of synchronization information during processing is a device setting. If the data type determination unit 906 determines that the data type is a device setting, the process advances to step S1502. If the data type determination unit 906 determines that the data type is not a device setting (for example, is a user setting), the process advances to step S1107. In step S1502, the synchronization request management unit 903 changes, to "temporary stop mode", the information representing an operating state in synchronization information during processing. The synchronization request management unit 903 causes the synchronization information storage unit 905 to save the synchronization information. After that, the synchronization request management unit 903 notifies the retry control unit 1401 that the synchronization information during processing is not a retry target when the operating state is the temporary stop mode. After the processing in step S1502, the process advances to step S1107.

As described above, according to the third embodiment, when the operating state is the temporary stop mode and synchronous communication fails, information of the operating state is not changed in step S1502 for a synchronization request for which synchronous communication should be performed even in the temporary stop mode, and synchronous communication is retried in step S1103 until it succeeds. When information of the operating state is not changed to "temporary stop mode" in step S1502, the next synchronization request is processed without retry in step S1103. In this embodiment, as for device configuration information which may be browsed by the management server 110, or a user setting which may be used by another multifunctional peripheral, synchronous communication is retired even in the temporary stop mode until it succeeds. Since retry in step S1103 is not performed for a synchronization request for which it is determined that retry is unnecessary, an increase in unnecessary traffic can be prevented. This embodiment has described device configuration information and a user setting as synchronization information for which synchronous communication should be performed even in the temporary stop mode. However, the synchronization information may be another data type as long as the information is highly likely to be used in the management server or another multifunctional peripheral.

In FIG. 15, the processing of step S1104 may be omitted, and if it is determined in step S1102 that the operating state is the temporary stop mode, the process may advance to step S1301 of FIG. 15.

Fourth Embodiment

In the third embodiment, when synchronous communication fails in the temporary stop mode, transmission processing is retried for information for which synchronous communication should be performed. Among causes of the failure of synchronous communication, there are a kind of cause against which synchronous communication will succeed if retry is performed, and a kind of cause against which, even if synchronous communication is retried, it is less likely to succeed and will fail. If retry is performed though synchronous communication is less likely to succeed even by retry, synchronous communication is frequently performed during the temporary stop mode, increasing the communication amount and the processing load. The fourth embodiment will explain an arrangement in which when the operating state is the temporary stop mode and synchronous communication fails, retry is controlled in accordance with the cause of the failure. A difference from the first to third embodiments will be explained below.

Figure 16:
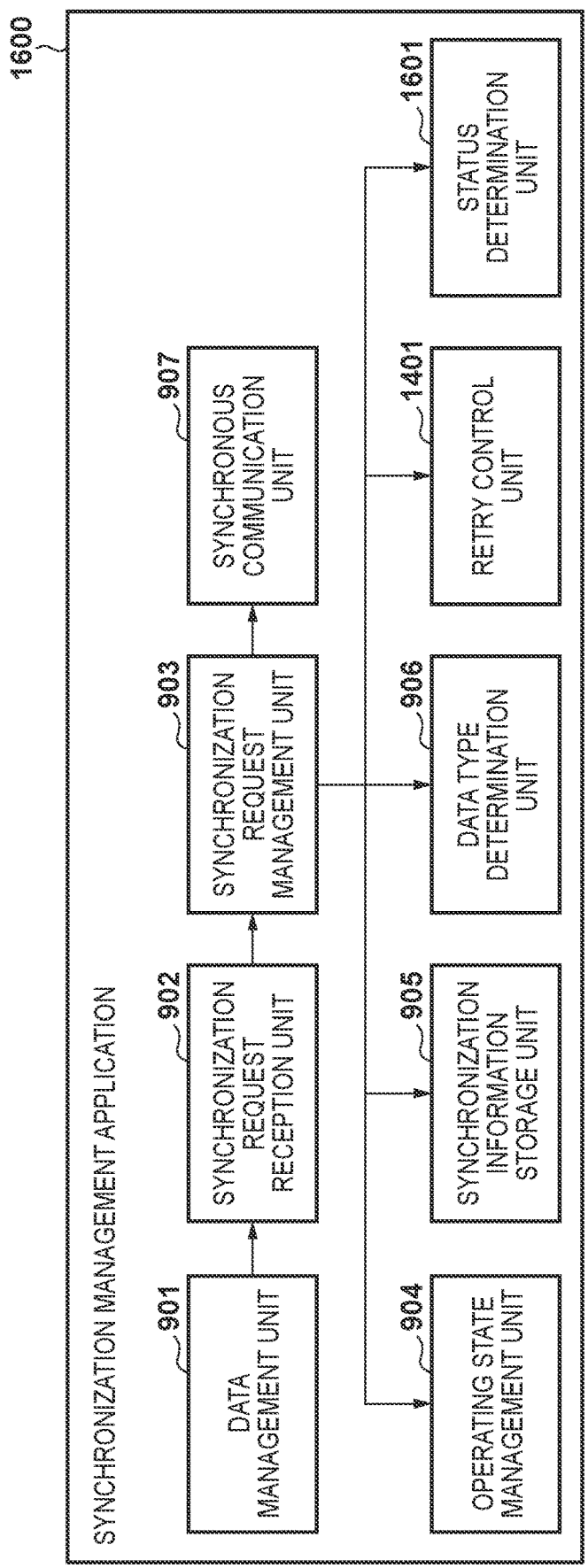
FIG. 16 is another block diagram showing the synchronization management application of the multifunctional peripheral.

FIG. 16 is a block diagram showing a synchronization management application 1600 that operates in a multifunctional peripheral 120 according to the fourth embodiment. As shown in FIG. 16, a synchronization request management unit 903 is also connected to a status determination unit 1601. The status determination unit 1601 determines whether to execute retry, based on a communication result (status information) obtained when a synchronous communication unit 907 performed synchronous communication with a management server 110. For example, when the status information represents an internal server error or that a service is unavailable, the status determination unit 1601 determines that synchronous communication should be executed again by retry. When the status information represents that the request is improper, authentication is necessary, or access is inhibited, the status determination unit 1601 determines not to perform retry in the temporary stop mode because, even if retry is executed, synchronous communication is highly likely to fail.

Figure 17:
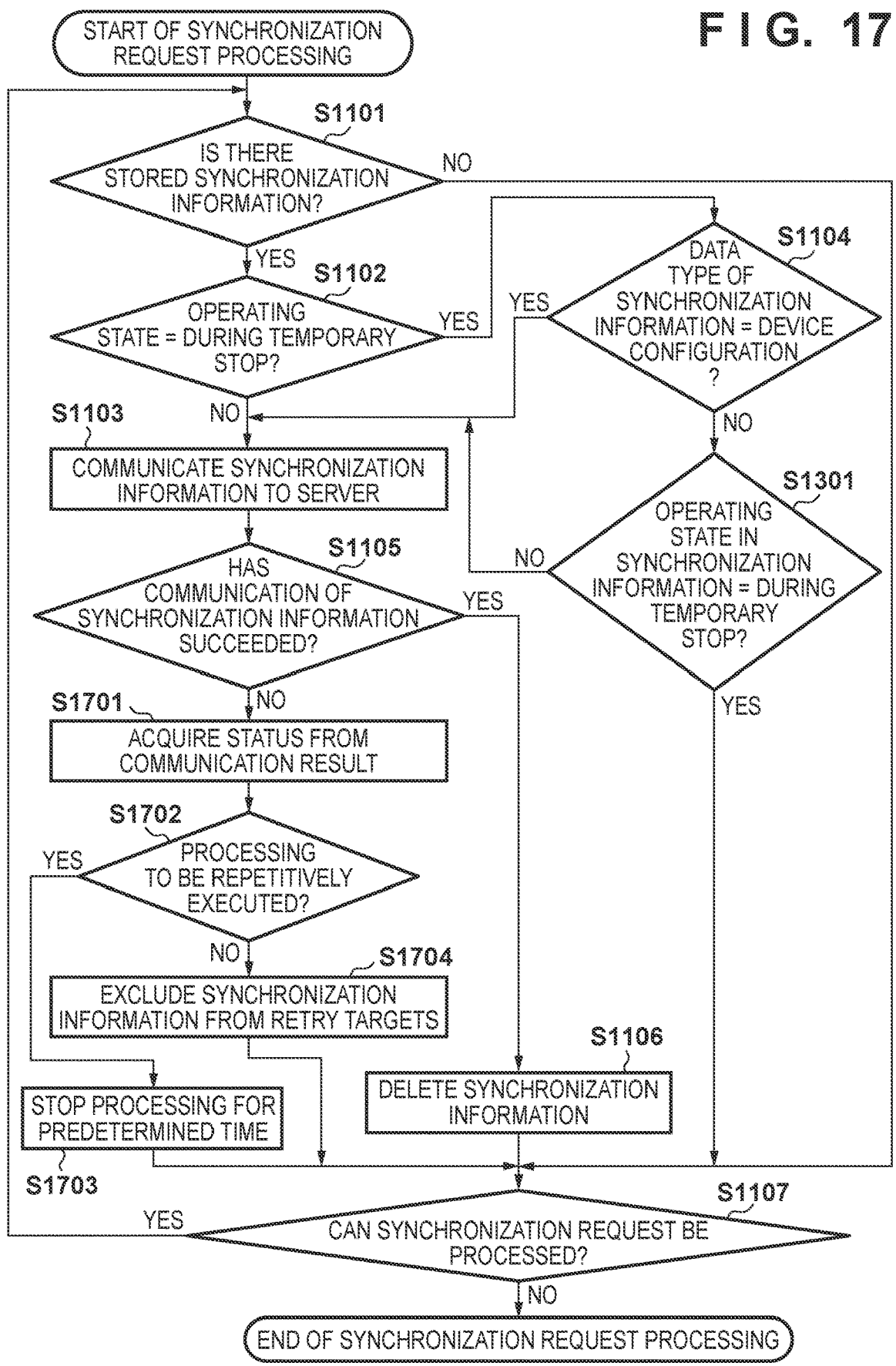
FIG. 17 is another flowchart showing processing of a synchronization request.

The flowchart of FIG. 17 shows the procedures of processing of a synchronization request accepted by the synchronization request management unit 903 according to the fourth embodiment. The processing shown in FIG. 17 is executed when data change processing of a setting DB 801 is performed by the processing of FIG. 12 and the synchronization request management unit 903 becomes able to process a synchronization request.

Steps S1101 to S1107 and S1301 in FIG. 17 correspond to the explanation of steps S1101 to S1107 and S1301 in FIG. 13.

In step S1105 of FIG. 17, as described with reference to FIG. 11, the synchronous communication unit 907 notifies the synchronization request management unit 903 of information representing whether synchronous communication with the management server 110 has succeeded. Based on the notified information, the synchronization request management unit 903 determines whether synchronous communication has succeeded or failed. If the synchronization request management unit 903 determines that synchronous communication has succeeded, the process advances to step S1106. If the synchronization request management unit 903 determines that synchronous communication has failed, the process advances to step S1701.

In step S1701, the synchronization request management unit 903 causes the status determination unit 1601 to acquire a communication result (status information) from the synchronous communication unit 907. In step S1702, the synchronization request management unit 903 determines, based on the status information, whether to perform retry after the lapse of a predetermined time. If the synchronization request management unit 903 determines to perform retry after the lapse of the predetermined time, the process advances to step S1703. If the synchronization request management unit 903 determines not to perform retry, the process advances to step S1704.

In step S1703, the synchronization request management unit 903 measures the lapse of the predetermined time by using a timer, and after the lapse of the predetermined time, the process advances to step S1107. In step S1704, the synchronization request management unit 903 adds information "temporary stop mode" to the operating state in synchronization information during processing. Then, the synchronization request management unit 903 causes a synchronization information storage unit 905 to save the synchronization information. Thereafter, the synchronization request management unit 903 notifies a retry control unit 1401 that the synchronization information during processing is not a retry target when the operating state is the temporary stop mode. After the processing in step S1704, the process advances to step S1107.

As described above, according to the fourth embodiment, when the operating state is the temporary stop mode and synchronous communication fails, it is determined in accordance with the cause of the failure whether to execute retry or not to execute retry because, even if synchronous communication is retried, it will fail. As a result, retry is not performed for a synchronization request for which synchronous communication is less likely to succeed. This can prevent increases in communication amount and processing load caused by frequent synchronous communication during the temporary stop mode. In addition, a situation in which another synchronization request cannot be processed as a result of retrying a synchronization request for which synchronous communication is less likely to succeed can also be avoided.

In FIG. 17, the processing of step S1104 may be omitted, and if it is determined in step S1102 that the operating state is the temporary stop mode, the process may advance to step S1301 of FIG. 17. It is also possible to, after the processing of step S1701, determine whether synchronization information during processing corresponds to a predetermined data type, and if the synchronization information corresponds to the predetermined data type, perform the processes in steps S1702 to S1704.

Fifth Embodiment

As described in step S1104 of FIG. 11, when the data type is device configuration information, even if the operating state is the temporary stop mode, synchronous communication with a management server 110 is performed. In this case, synchronization information for which synchronous communication should be performed is information (operation information) regarding an operating state included in device configuration information. When the device configuration information includes even information other than the operation information, even if the information other than the operation information is changed, a synchronization request is generated and synchronous communication with the management server 110 is executed in the temporary stop mode.

The fifth embodiment will explain an arrangement in which synchronous communication with the management server 110 is performed only when the operating state is the temporary stop state and operation information out of device configuration information is changed. A difference from the first to fourth embodiments will be explained below.

Figure 18:
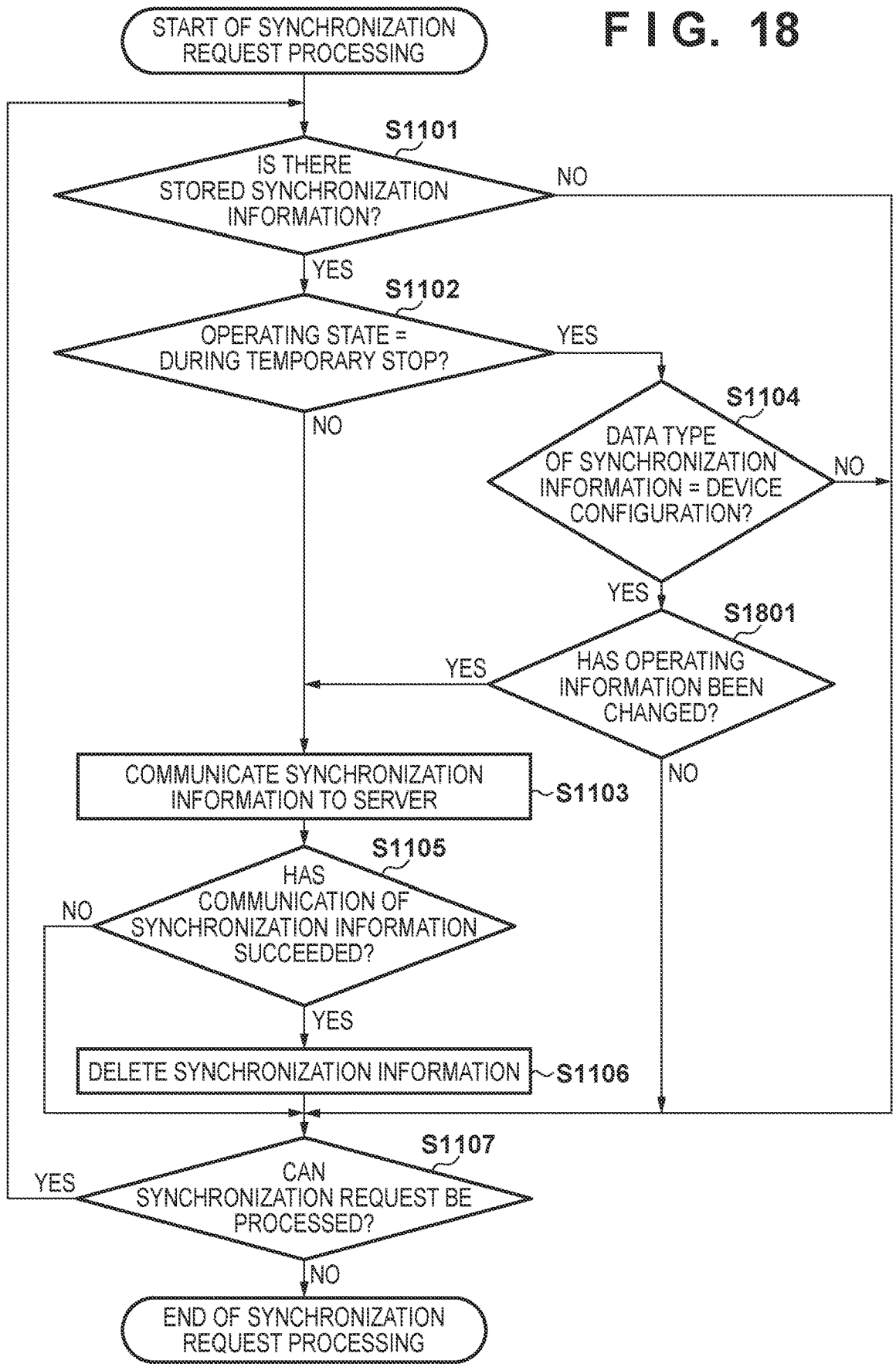
FIG. 18 is another flowchart showing processing of a synchronization request.

The flowchart of FIG. 18 shows the procedures of processing of a synchronization request accepted by a synchronization request management unit 903 according to the fifth embodiment. The processing shown in FIG. 16 is executed when data change processing of a setting DB 801 is performed by the processing of FIG. 10 or 12 and the synchronization request management unit 903 becomes able to process a synchronization request.

Steps S1101 to S1107 in FIG. 18 correspond to the explanation of steps S1101 to S1107 in FIG. 11. In step S1104, the synchronization request management unit 903 causes a data type determination unit 906 to determine whether the data type of synchronization information is device configuration information. If the data type determination unit 906 determines that the data type is device configuration information, the process advances to step S1801.

In step S1801, the synchronization request management unit 903 determines whether operation information included in the device configuration information of the synchronization information during processing has been changed. If the synchronization request management unit 903 determines that the operation information has been changed, the process advances to step S1103. If the synchronization request management unit 903 determines that the operation information has not been changed, the process advances to step S1107.

As described above, according to the fifth embodiment, only when operation information of which the management server 110 should be notified is changed, a synchronization request is processed. As a result, execution of unnecessary synchronous communication in the temporary stop mode can be prevented.

Sixth Embodiment

In the first embodiment, even when the operating state is the temporary stop mode, synchronous communication is performed for a setting for which synchronous communication with the management server 110 should be performed. In the second embodiment, synchronous communication is performed for untransmitted data corresponding to a synchronization request accepted when the operating state was the synchronous communication mode, and the operating state has changed to the temporary stop mode before the completion of setting transmission processing. In the third embodiment, when synchronous communication fails in the temporary stop mode, transmission processing is retried for information for which synchronous communication should be performed. In the fourth embodiment, whether to execute retry is determined in accordance with the failure factor of synchronous communication. In the fifth embodiment, if a setting for which synchronous communication should be performed includes information other than operation information, synchronous communication is performed only when the operation information is changed. The sixth embodiment will explain a case in which when the operating state of a multifunctional peripheral 120 is the temporary stop mode, a user setting is changed.

The settings of a plurality of devices are synchronized between the respective devices in a system 100 via a management server 110. The user can use the same user setting in any device. When the operating state of a device to be used is the temporary stop mode, synchronous communication is restricted, and even if the user logs in, synchronous communication to acquire a user setting from the management server 110 is not performed.

Assume that the user edits a user setting during the temporary stop mode. At this time, since the user setting is not acquired from the management server 110, data edited by the user in the device is temporarily stored in a cache memory or the like as data that does not reflect a management condition by the management server 110, such as one regarding the data size. When the temporary stop mode is canceled, the device restarts synchronous communication, and updates the user setting in the management server 110 by using the edited data stored in the cache memory. However, when the user setting already managed in the management server 110 is used in another device, a data mismatch with the edited data may influence another device. The sixth embodiment will explain an arrangement in which when the operating state is the temporary stop mode and a synchronization request for a user setting is generated, a mismatch of the user setting is prevented. A difference from the first to fifth embodiments will be explained below.

Figure 19:
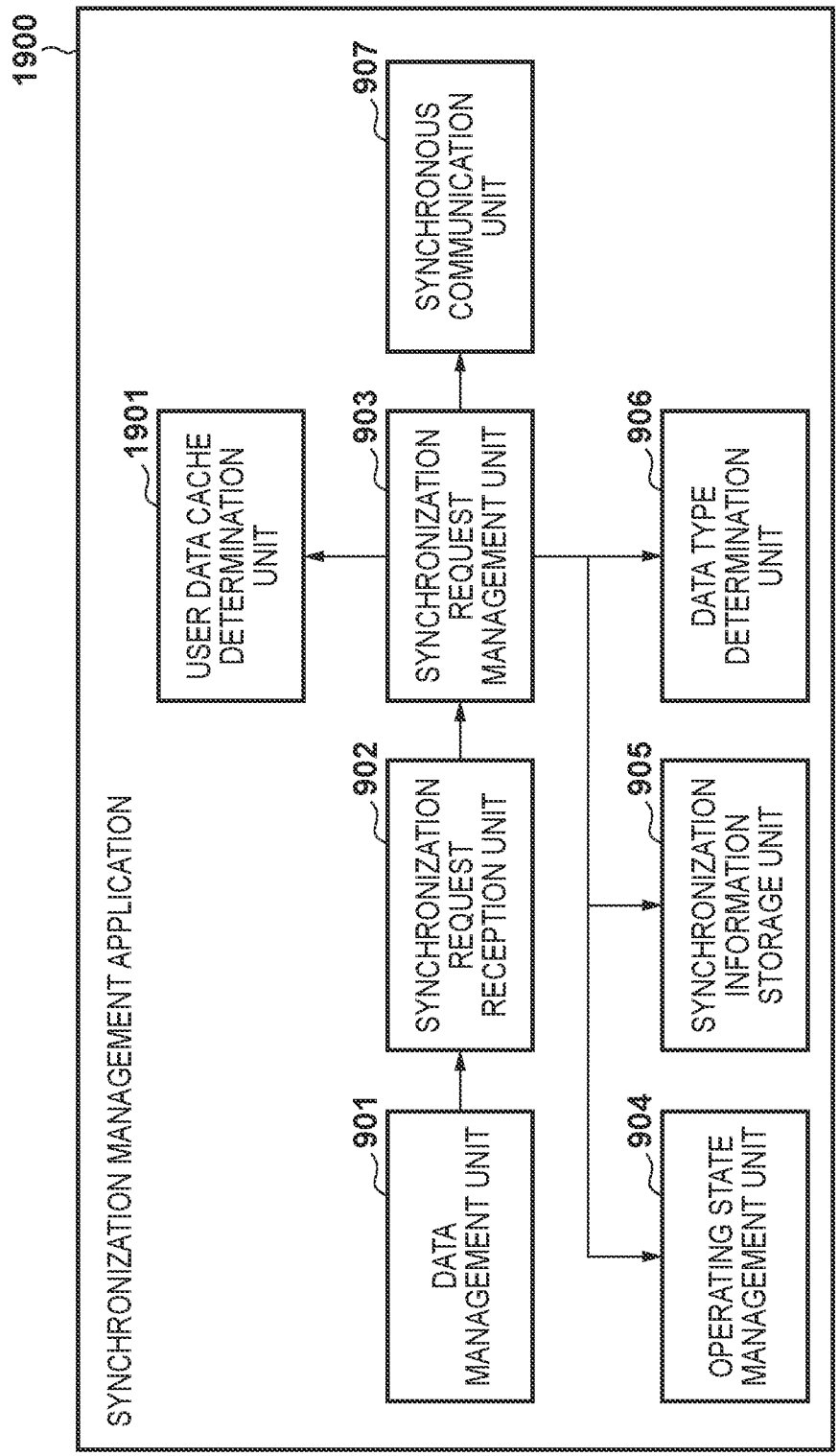
FIG. 19 is another block diagram showing the synchronization management application of the multifunctional peripheral.

FIG. 19 is a block diagram showing a synchronization management application 1900 that operates in the multifunctional peripheral 120 according to the sixth embodiment. As shown in FIG. 19, a synchronization request management unit 903 is connected to a user data cache determination unit 1901. When a user setting is acquired, the user data cache determination unit 1901 determines whether the user setting exists in the internal database of the multifunctional peripheral 120 and whether it exists in the database of the management server 110.

Figure 20:
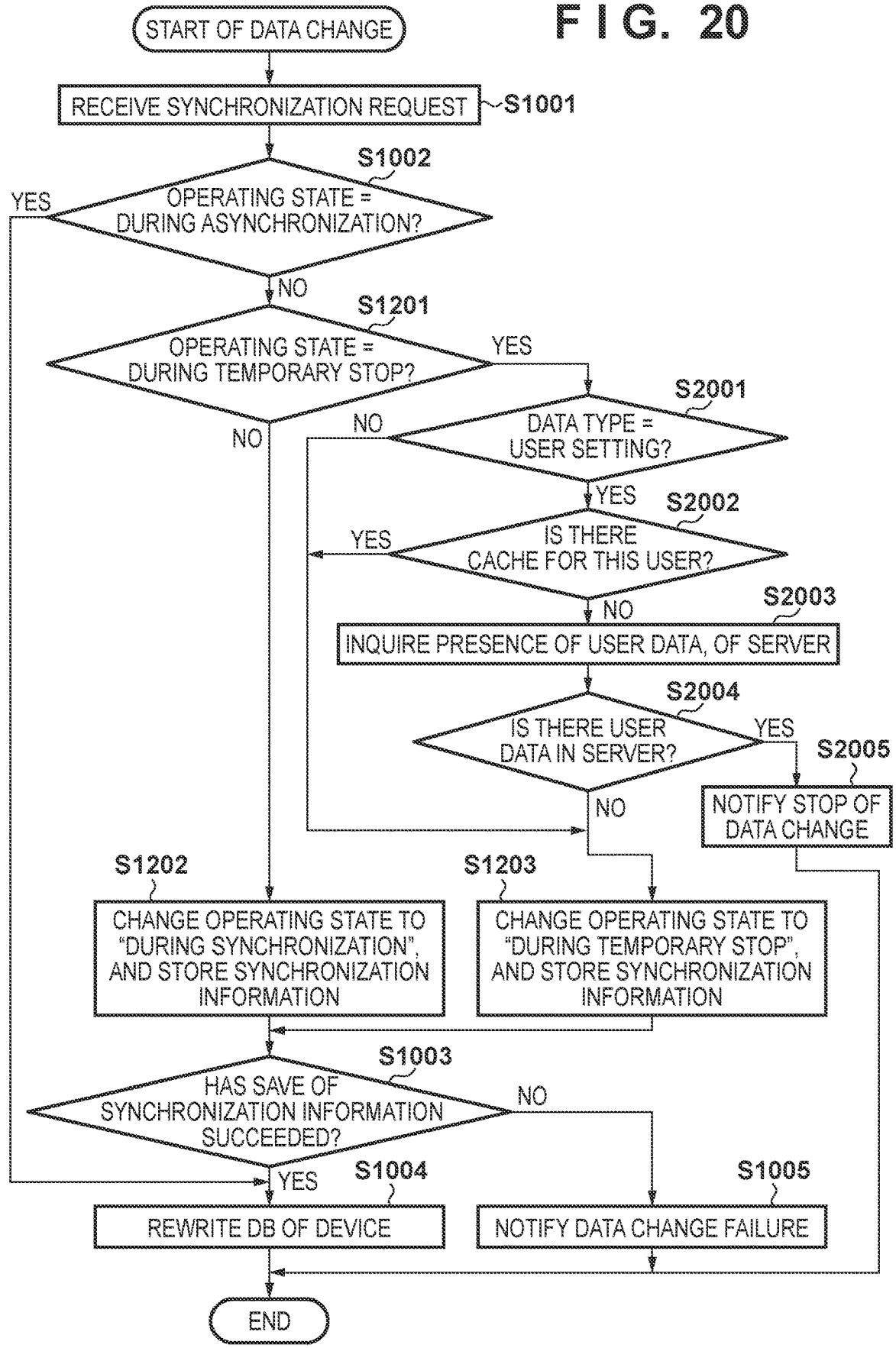
FIG. 20 is another flowchart showing processing when a synchronization request is accepted.

The flowchart of FIG. 20 shows procedures from acceptance of a setting change instruction from a user by a data management unit 901 up to processing of it as a synchronization request to the management server 110 according to the sixth embodiment.

Steps S1001 to S1005 and S1201 to S1203 in FIG. 20 correspond to the explanation of steps S1001 to S1005 and S1201 to S1203 in FIG. 12. In step S1201 of FIG. 20, as described with reference to FIG. 12, the synchronization request management unit 903 determines whether an operating state acquired from an operating state management unit 904 is the temporary stop mode. If the synchronization request management unit 903 determines that the operating state is the temporary stop mode, the process advances to step S2001.

In step S2001, the synchronization request management unit 903 determines whether the data type of synchronization information during processing by the data type determination unit 906 is a user setting. If the synchronization request management unit 903 determines that the data type is a user setting, the process advances to step S2002. If the synchronization request management unit 903 determines that the data type is not a user setting, the process advances to step S1203.

In step S2002, the synchronization request management unit 903 causes the user data cache determination unit 1901 to determine whether a user ID included in the synchronization information during processing exists in the internal database of the multifunctional peripheral 120. For example, in this embodiment, each setting in a setting DB 801 of FIG. 8 is associated with a user ID. In the processing of step S2002, this determination is made by referring to the setting DB 801 of FIG. 8. If the user data cache determination unit 1901 determines in step S2002 that the user ID exists, the process advances to step S1203. If the user data cache determination unit 1901 determines in step S2002 that the user ID does not exist, the process advances to step S2003.

In step S2003, the synchronization request management unit 903 inquires, of the management server 110, whether a user setting specified from the user ID of the synchronization information during processing exists in the management server 110, and acquires an inquiry result from the management server 110. In step S2004, the synchronization request management unit 903 refers to the inquiry result received in step S2003, and determines whether the user setting specified from the user ID of the synchronization information during processing exists in the management server 110. If the synchronization request management unit 903 determines that the user setting exists, the process advances to step S2005. If the synchronization request management unit 903 determines that the user setting does not exist, the process advances to step S1203.

In step S2005, the synchronization request management unit 903 determines to stop the synchronization request, in order to prevent a data mismatch after the restart of synchronous communication because the user setting corresponding to the synchronization information during processing exists in the management server 110. The synchronization request management unit 903 notifies the data management unit 901 via a synchronization request reception unit 902 to stop the synchronization of the data change. The data management unit 901 receives the data change stop notification from the synchronization request management unit 903 via the synchronization request reception unit 902. After the processing in step S2005, the processing in FIG. 20 ends.

To the contrary, if the user setting corresponding to the synchronization information during processing does not exist in the management server 110, the synchronization information is stored in step S1203. When the temporary stop mode is canceled and synchronous communication restarts, the multifunctional peripheral 120 performs synchronous communication using the synchronization information stored in step S1203. In this case, the synchronization information stored in step S1203 is new data in the management server and thus does not cause at least a data mismatch.

As described above, according to the sixth embodiment, when the operating state is the temporary stop mode and a synchronization request for a user setting is generated, the presence of the user setting is confirmed in both the internal DB of the device and the internal DB of the management server 110, and it is determined whether to execute the synchronization request. If the user setting exists in the management server 110, storage in step S1203 is not performed. If the user setting does not exist in the management server 110, storage in step S1203 is performed. This can prevent a case in which a user setting that is managed in the management server 110 and is being used in another device is rewritten by an unintended value and a mismatch is generated by synchronous communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-098053, filed May 9, 2014, which is hereby incorporated by reference herein in its entirety.

What is claimed is:

1. A communication system comprising:
a server comprising:
at least one controller configured to store setting information notified from a communication apparatus in a storage area, and
the communication apparatus which is operable in one of a plurality of modes including a first mode and a second mode, the communication apparatus comprising:
a reception device configured to receive an instruction from a user; and
at least one controller configured to,
in accordance with a changing instruction regarding a predetermined function received via the reception device in a state that the first mode is set, notify the server of setting information based on the changing instruction and, in accordance with the changing instruction regarding the predetermined function received via the reception device in a state that the second mode is set, not notify the server of the setting information based on the changing instruction, and
wherein the controller of the communication apparatus, in a case where a switching instruction for switching a mode from the first mode to the second mode is received via the reception device, notifies the server of the setting information which corresponds to the changing instruction received via the reception device before the switching instruction was received and which has not been notified to the server.

2. A communication apparatus which is operable in one of a plurality of modes including a first mode and a second mode, the communication apparatus comprising:
a reception device configured to receive an instruction from a user; and
at least one controller configured to,
in accordance with a changing instruction regarding a predetermined function received via the reception device in a state that the first mode is set, notify a server of setting information based on the changing instruction and, in accordance with the changing instruction regarding the predetermined function received via the reception device in a state that the second mode is set, not notify the server of the setting information based on the changing instruction, and
wherein the controller of the communication apparatus, in a case where a switching instruction for switching a mode from the first mode to the second mode is received via the reception device, notifies the server of the setting information which corresponds to the changing instruction received via the reception device before the switching instruction was received and which has not been notified to the server.

3. The communication apparatus according to claim 2, wherein the setting information is setting information regarding a printing function.

4. The communication apparatus according to claim 3, wherein the setting information regarding the printing function is print setting information which is associated with a user ID.

5. The communication apparatus according to claim 3, wherein the setting information regarding the printing function includes at least one of a color mode, a number of copies, a print quality, copy-forgery-inhibited pattern printing, or a printing density.

6. The communication apparatus according to claim 2, wherein the setting information which has been notified to the server is synchronized with setting information stored in another communication apparatus.

7. The communication apparatus according to claim 2, wherein the first mode is a synchronous communication mode.

8. The communication apparatus according to claim 2, wherein the second mode is a temporary stop mode.

9. The communication apparatus according to claim 2, further comprising a printer.

10. The communication apparatus according to claim 2, further comprising a scanner.

11. A control method of a communication apparatus which is operable in one of a plurality of modes including a first mode and a second mode, and includes a reception device configured to receive an instruction from a user, the control method comprising the steps of:
in accordance with a changing instruction regarding a predetermined function received via the reception device in a state that the first mode is set, notifying a server of setting information based on the changing instruction and, in accordance with the changing instruction regarding the predetermined function received via the reception device in a state that the second mode is set, not notifying the server of the setting information based on the changing instruction, and
wherein, in a case where a switching instruction for switching a mode from the first mode to the second mode is received via the reception device, notifying the server of the setting information which corresponds to the changing instruction received via the reception device before the switching instruction was received and which has not been notified to the server.

12. The control method according to claim 11, wherein the setting information is setting information regarding a printing function.

13. The control method according to claim 12, wherein the setting information regarding the printing function is print setting information which is associated with a user ID.

14. The control method according to claim 12, wherein the setting information regarding the printing function includes at least one of a color mode, a number of copies, a print quality, copy-forgery-inhibited pattern printing, or a printing density.

15. The control method according to claim 11, wherein the setting information which has been notified to the server is synchronized with setting information stored in another communication apparatus.

16. The control method according to claim 11, wherein the first mode is a synchronous communication mode.

17. The control method according to claim 11, wherein the second mode is a temporary stop mode.

18. A non-transitory computer-readable storage medium storing a program causing a computer to execute a control method of a communication apparatus which is operable in one of a plurality of modes including a first mode and a second mode, and includes a reception device configured to receive an instruction from a user, the control method comprising the steps of:

in accordance with a changing instruction regarding a predetermined function received via the reception device in a state that the first mode is set, notifying a server of setting information based on the changing instruction and, in accordance with the changing instruction regarding the predetermined function received via the reception device in a state that the second mode is set, not notifying the server of the setting information based on the changing instruction, and wherein, in a case where a switching instruction for switching a mode from the first mode to the second mode is received via the reception device, notifying the server of the setting information which corresponds to the changing instruction received via the reception device before the switching instruction was received and which has not been notified to the server.

* * * * *